United States Patent
Kamel et al.

(10) Patent No.: US 11,858,828 B2
(45) Date of Patent: Jan. 2, 2024

(54) SUB-100 NM OXIDIZED TRANSITION METAL TUBULAR ARCHITECTURES

(71) Applicant: THE AMERICAN UNIVERSITY IN CAIRO, New Cairo (EG)

(72) Inventors: Menna Tulla Samir Kamel, Nasar (EG); Nageh K. Allam, New Cairo (EG)

(73) Assignee: THE AMERICAN UNIVERSITY IN CAIRO, New Cairo (EG)

( * ) Notice: Subject to any disclaimer, the term of this patent is extended or adjusted under 35 U.S.C. 154(b) by 106 days.

(21) Appl. No.: 17/135,153

(22) Filed: Dec. 28, 2020

(65) Prior Publication Data

US 2021/0292183 A1 Sep. 23, 2021

Related U.S. Application Data

(63) Continuation of application No. 15/779,724, filed as application No. PCT/IB2016/002033 on Dec. 2, 2016, now abandoned.

(60) Provisional application No. 62/262,743, filed on Dec. 3, 2015.

(51) Int. Cl.
*C01G 23/047* (2006.01)
*C25D 11/26* (2006.01)

(52) U.S. Cl.
CPC ............ *C01G 23/047* (2013.01); *C25D 11/26* (2013.01); *C01P 2002/72* (2013.01); *C01P 2002/82* (2013.01); *C01P 2004/03* (2013.01); *C01P 2004/04* (2013.01); *C01P 2004/13* (2013.01)

(58) Field of Classification Search
CPC ............................ C01G 23/047; C25D 11/26
See application file for complete search history.

(56) References Cited

U.S. PATENT DOCUMENTS

2006/0249705 A1‡ 11/2006 Wang ..................... A61L 29/18
252/62.51 C
2010/0213046 A1‡ 8/2010 Grimes ................ B01J 23/8926
204/157.47

FOREIGN PATENT DOCUMENTS

CN 103 714 978 ‡ 4/2014
CN 103714978 A 4/2014

OTHER PUBLICATIONS

European Office Action dated May 7, 2021 in European Patent Application No. 16 908 728.5, 5 pages.
International Search Report and Written Opinion dated Mar. 20, 2018 in PCT/IB2016/002033 filed Dec. 2, 2016.
Changdeuck Bae, et al., "Hierarchical Titania Nanotubes with Self-Branched Crystalline Nanorods," ACS Applied Materials & Interfaces, vol. 2, No. 6, Jun. 7, 2010, pp. 1581-1587.

(Continued)

*Primary Examiner* — James A Fiorito
(74) *Attorney, Agent, or Firm* — Oblon, McClelland, Maier & Neustadt, L.L.P.

(57) ABSTRACT

An array of transition metal tubular architectures, where the transition metal tubular architectures are comprised of a transition metal oxide, sulfide, or selenide, and wherein transition metal tubular architectures are less than 100 nm in length. The transition metal tubular architectures can be at least partially crystalline. Within the array of transition metal tubular architectures, at least 80% of the transition metal tubular architectures can be less than 100 nm in length.

18 Claims, 28 Drawing Sheets

(56) References Cited

OTHER PUBLICATIONS

Hiroaki Tsuchiya, et al., "Self-organized $TiO_2$ nanotubes prepared in ammonium fluoride containing acetic acid electrolytes," Electrochemistry Communications, vol. 7, 2005, pp. 576-580.
Yanbiao Liu, et al., "Highly stable CdS-modified short $TiO_2$ nanotube array electrode for efficient visible-light hydrogen generation," International Journal of Hydrogen Energy, vol. 36, 2011, pp. 167-174.
Kiyoung Lee, et al., "One-dimensional Titanium Dioxide Nanomaterials: Nanotubes," Chemical Reviews, Aug. 14, 2014, 260 Pages.
Zhaoyue Liu, et al., "Highly Ordered $TiO_2$ Nanotube Arrays with Controllable Length for Photoelectrocatalytic Degradation of Phenol," Journal of Physical Chemistry C, vol. 112, 2008, pp. 253-259.
Extended Search Report dated Oct. 16, 2019, in European patent application No. 16908728.5, (20 pages).
Bauer et al, "$TiO_2$ nanotubes: Tailoring the geometry in $H_3PO_4$/HF electrolytes", *Electrochemistry Communications*, 2006, vol. 8, No. 8, pp. 1321-1325.
Wang et al, "$TiO_2$ Nanotubes with Tunable Morphology, Diameter and Length: Synthesis and Photo-Electrical/Catalytic Performance", *Chemistry of Materials*, 2009, vol. 21, No. 7, pp. 1198-1206.

‡ imported from a related application

SUB-100 NM OXIDIZED TRANSITION METAL TUBULAR ARCHITECTURES

STATEMENT REGARDING FEDERALLY SPONSORED RESEARCH OR DEVELOPMENT

N/A

JOINT RESEARCH AGREEMENT

N/A

STATEMENT REGARDING PRIOR DISCLOSURES BY THE INVENTOR OR A JOINT INVENTOR

N/A

BACKGROUND OF THE INVENTION

Sub-100 nm hollow metal-oxide architectures are highly desirable for their applications in drug delivery, lithium-ion batteries, photoelectrochemical devices, dye-sensitized solar cells (DSSCs), and metal oxide field-effect transistors (MOSFETS), among others. Over the past two decades, sub-100 nm metal oxides have been assembled in high performance field-effect transistors as a gate oxide material. However, one of the drawbacks of MOSFETs is their high manufacturing cost. Finding a facile and cost-effective way to produce sub-100 nm architectures would render those structures useful in many applications. Micro and nanostructures with hollow interiors are synthesized via diverse routes such as templating, ultra-sonication, spray drying or pyrolysis, laser pyrolysis, among others. However, these synthesis processes face limitations such as poor control over the size and shape of the hollow structures, reproducibility issues, and running cost.

Hollow $TiO_2$ nanoparticles are of particular interest as these nanoparticles show much promise for the design of highly active nanostructured catalysts due to their low density, high strength, high active surface area, and improved light harvesting characteristics. These nanoparticles are widely used as photoanode material in DSSCs mainly because of their large surface area, enabling the absorption of an enormous amount of dye.

One drawback of nanoparticles commonly used in, e.g, water splitting, is their small grain boundaries, which act as recombination centers of charge carriers, resulting in short lifetime of the electrons. Nanotubes with their one-dimensional structure and ordered morphology, on the other hand, offer the advantage of directed electron transport and electron/hole pair separation. Previous studies on the effect of the nanotube length on the electron transport process showed the superiority of the electron transport process within the short titanium dioxide nanotubes in comparison to the long ones. Liu et al. showed that the electron transport process within short titanium dioxide nanotubes (280 nm) was much favorable in comparison to that for long titania nanotubes. Xianfeng et al. reported a study on the quantum efficiency of $TiO_2$ nanotubes with respect to the tube length. The measurements showed the shorter the nanotubes, the higher the resulting quantum efficiency.

However, to date there has been no disclosure of arrays of transition metal tubular architectures, such as $TiO_2$ nanotubes, that are sub-100 nm in length. There is also no disclosure of such arrays where the transition metal tubular architectures are at least partially crystalline.

BRIEF SUMMARY OF THE INVENTION

Embodiments of the present invention include, but are not limited to, the following embodiments

[1] An array of transition metal tubular architectures, wherein the transition metal tubular architectures are comprised of a transition metal oxide, sulfide, or selenide, and wherein transition metal tubular architectures are less than 100 nm in length.

[2] An array of transition metal tubular architectures according to embodiment 1, wherein at least 80% of the transition metal tubular architectures are less than 100 nm in length.

[3] An array of transition metal tubular architectures according to embodiment 1, wherein at least 85% of the transition metal tubular architectures are less than 100 nm in length.

[4] An array of transition metal tubular architectures according to embodiment 1, wherein at least 90% of the transition metal tubular architectures are less than 100 nm in length.

[5] An array of transition metal tubular architectures according to embodiment 1, wherein at least 95% of the transition metal tubular architectures are less than 100 nm in length.

[6] An array of transition metal tubular architectures according to embodiment 1, wherein 100% of the transition metal tubular architectures are less than 100 nm in length.

[7] An array of transition metal tubular architectures according to embodiment 1, wherein the transition metal tubular architectures are a transition metal oxide, sulfide, or selenide in the form of a hollow nanotube.

[8] An array of transition metal tubular architectures according to embodiment 1, wherein the transition metal tubular architectures are comprised of an oxide, sulfide, or selenide of at least one transition metal selected from the group consisting of Y, Ti, Zr, V, Ta, and db.

[9] An array of transition metal tubular architectures according to embodiment 8, wherein the transition metal tubular architectures are at least partially crystalline.

[10] An array of transition metal tubular architectures according to embodiment 1, wherein the transition metal tubular architectures are comprised of an oxide of at least one transition metal selected from the group consisting of Y, Ti, Zr, and V.

[11] An array of transition metal tubular architectures according to embodiment 10, wherein the transition metal tubular architectures are at least partially crystalline.

[12] An array of transition metal tubular architectures according to embodiment 1, wherein the transition metal tubular architectures are comprised of titanium dioxide.

[13] An array of transition metal tubular architectures according to embodiment 1, wherein at least 80% of the transition metal tubular architectures are titanium dioxide nanotubes.

[14] An array of transition metal tubular architectures according to embodiment 1, wherein at least 85% of the transition metal tubular architectures are titanium dioxide nanotubes.

[15] An array of transition metal tubular architectures according to embodiment 1, wherein at least 90% of the transition metal tubular architectures are titanium dioxide nanotubes.

[16] An array of transition metal tubular architectures according to embodiment 1, wherein at least 95% of the transition metal tubular architectures are titanium dioxide nanotubes.

[17] An array of transition metal tubular architectures according to embodiment 1, wherein the transition metal tubular architectures are at least partially crystalline.

[18] A method of making an array of transition metal tubular architectures according to embodiment 1, the method comprising oxidizing a transition metal, said transition metal immersed in a fluid medium that comprises an electrolyte, an acid, and a polymer.

[19] A method according to embodiment 18, wherein said oxidizing comprises oxidizing by galvanic anodization.

[20] A method according to embodiment 19, wherein said galvanic anodization takes place in an electrochemical cell that comprises at least two electrodes present in the fluid medium as part of the electrochemical cell, wherein said transition metal that is oxidized is in the form of an electrode.

[21] A method according to embodiment 20, wherein the fluid medium comprises an electrolyte, an acid, and a polymer having a controlled current passing therethrough.

[22] A method according to embodiment 18, wherein said electrolyte comprises NH4F.

[23] A method according to embodiment 18, wherein said acid comprises acetic acid.

[24] A method according to embodiment 18, wherein said polymer comprises polyvinylpyrrolidone.

[25] A method according to embodiment 24, wherein said polyvinylpyrrolidone has a molecular weight of from 20,000 g/mol to 1,000,000 g/mol.

[26] A method according to embodiment 18, wherein the temperature of the reaction environment in which the oxidizing takes place is from −50° C. to 30° C.

BRIEF DESCRIPTION OF THE SEVERAL VIEWS OF THE DRAWINGS

FIG. 1A shows the SEM image of the as-anodized $TiO_2$ nanotubes with an average pore diameter of 20±3 nm and an average length of 70±10 nm.

FIG. 1B shows the tubular shape of the as-anodized sub-100 nm structures.

FIG. 1C shows the HR-TEM image of the as-anodized nanotubes, which reveals its partial crystallinity.

FIG. 1D shows the SEM image of the as-anodized $TiO_2$ nanotubes with an average pore diameter of 20±3 nm and an average length of 70±10 nm.

FIG. 1E shows the TEM image of the nanotubes annealed at 400° C.

FIG. 1F shows the HR-TEM image of the nanotubes annealed at 400° C.

DETAILED DESCRIPTION OF THE INVENTION

Figure 1A:
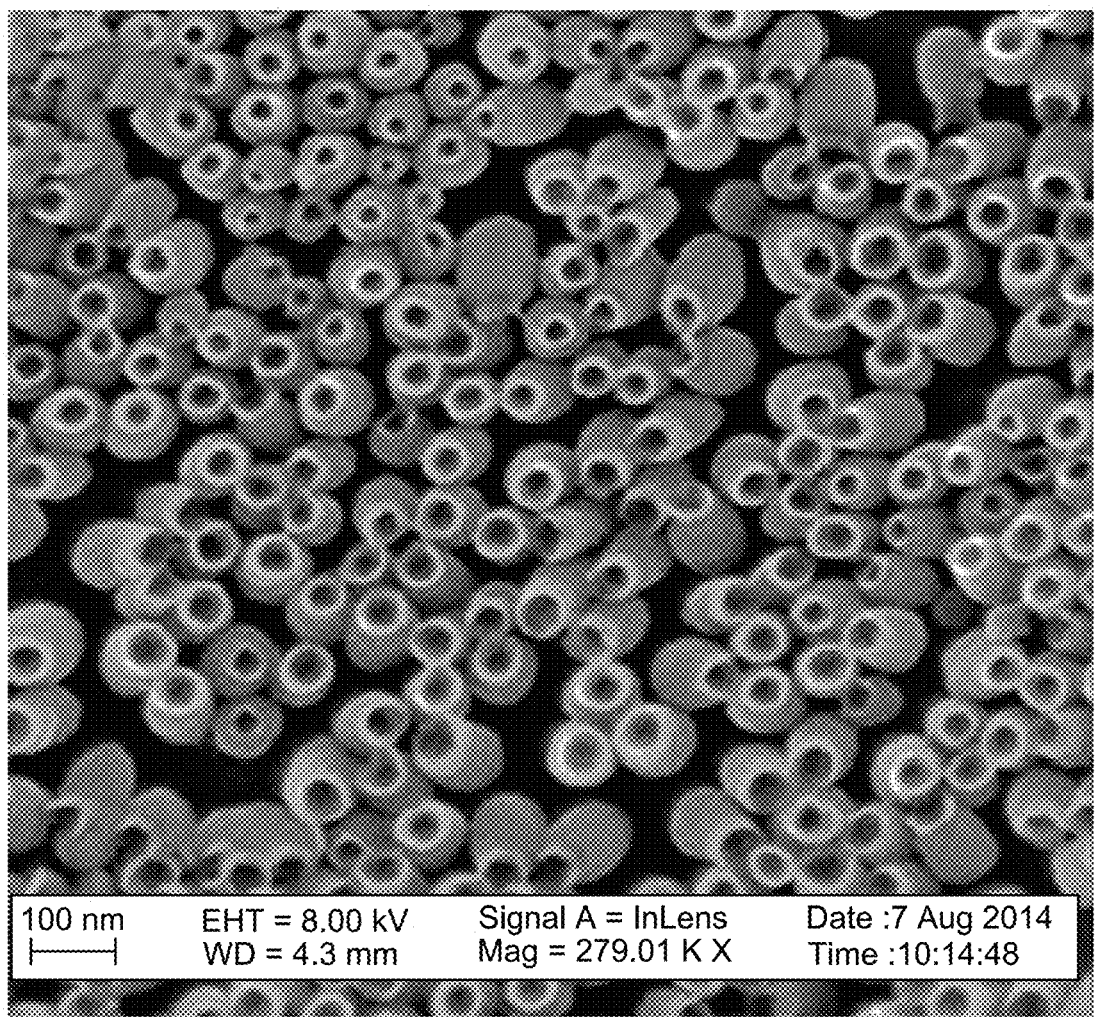
FIG. 1A to FIG. 1F show the scanning electron microscopy (SEM) images of the fabricated sub-100 nm $TiO_2$ tubular structures before and after annealing.

Unless indicated otherwise, the indefinite articles "a" and "an" are synonymous with "at least one" or "one or more." Unless indicated otherwise, definite articles used herein, such as "the," also include the plural of the noun. The terms "comprising," "consisting essentially of," "consisting of," and their related forms (e.g. comprises, etc), have their ordinary and customary meaning under U.S. patent law and are within the scope of the present invention. Unless indicated otherwise, the terms "method(s)" and "process(es)" are synonymous.

Unless otherwise indicated, the elements of methods or processes described herein are not necessarily performed in the order in which the process elements are listed.

Unless otherwise indicated, the term "nano" as used herein has its ordinary and customary meaning of being on the order of $1\times10^{-9}$, with, for example, a "nanometer" being on the order of $1\times10^{-9}$ m.

Embodiment One

One embodiment of the present invention relates to an array of transition metal tubular architectures, wherein the transition metal tubular architectures are comprised of a transition metal oxide, sulfide, or selenide, and wherein transition metal tubular architectures are less than 100 nm in length. In preferred embodiments, the transition metal tubular architectures are at least partially crystalline.

The transition metal tubular architectures are one-dimensional structures; as used herein, the term "one-dimensional" relates to the length dimension of the nanotubes. Accordingly, as used herein, the term "sub-100 nm" refers to transition metal tubular architectures that are less than 100 nm in length. The tubular architectures are preferably hollow nanotubes.

In some embodiments of the present invention, a distribution of transition metal tubular architectures exists within the array where architectures of different lengths are present. The transition metal tubular architectures can be, independently, from 50 to less than 100 nm in length, preferably from 60 to 90 nm in length, more preferably from 60 to 80 nm in length, and even more preferably from 65 to 75 nm in length, e.g, 70 nm in length. The variance in these length values is ±10 nm, more preferably ±5 nm, more preferably ±3 nm, more preferably ±1 nm, and most preferably ±0.5 nm. All real numbers between these minimum and maximum values are disclosed herein.

In these embodiments, at least 80% of the architectures, e.g. hollow transition metal oxide, sulfide, and/or selenide nanotubes, are less than 100 nm in length, preferably at least 85%, more preferably at least 90%, and most preferably at least 95% of the nanotubes are less than 100 nm in length. The "distribution of metal tubular architectures" can be referred to as an array of metal tubular architectures. All real numbers between these minimum and maximum values are disclosed herein.

In another embodiment, 100% of the transition metal tubular architectures are less than 100 nm in length.

As used herein, the transition metal of the transition metal tubular architectures comprises all transition metals of the periodic table of elements. Preferred transition metals comprise, but are not limited to, Scandium, Yttrium, Titanium, Zirconium, Vanadium, Niobium, Tantalum, and Dubnium. Most preferably, the transition metals comprise, but are not limited to, Yttrium, Titanium, Zirconium, with Titanium being the most preferred transition metal.

The transition metal tubular architectures are comprised preferably of oxides of the transition metals listed above. At least one of the transition metals described above can be present in the transition metal tubular architectures. Preferably, one transition metal is the predominate transition metal present in the transition metal tubular architectures, meaning that at least 51 mol % of the transition metals in the transition metal tubular architectures is one transition metal listed above. In preferred embodiments, at least 75 mol % of the transition metals in the transition metal tubular architectures is one transition metal listed above, more preferably at least 80 mol %, more preferably at least 85 mol %, more preferably at least 90 mol %. In another preferred embodiment, one transition metal listed above represents 100 mol % of the transition metal present as the transition metal of the transition metal tubular architecture. In one embodiment the transition metal can include alloys of the metals listed above. All real numbers between these minimum and maximum values are disclosed herein.

In preferred embodiments, the transition metal tubular architectures of the present invention are at least partially crystalline, where the partial crystallinity can be determined by analytical techniques such as X-ray diffraction. The terms "partially crystalline" and "partial crystallinity" as used herein means that the resultant metal tubular structures show by standard characterizations such as x-ray diffraction (or other characterizations noted below) signatures of at least one polycrystalline phase. In these embodiments, the transition metal tubular architectures are characterized by crystal structures and exhibit facets in their crystal structures. The facets can be the {001}, {004}, {101}, {105}, {200}, and {211} facets. The facets are determined by, for example, X-ray diffraction (XRD) pattern analysis of the transition metal tubular architectures, and facets correspond to diffraction peaks determined from XRD analyses. For example, in the embodiment where the transition metal tubular architecture is a titanium oxide nanotube and a distribution of nanotubes is present, all nanotubes being sub 100 nm in length, the nanotubes are characterized by diffraction peaks at 25.3°, 37.7°, 47.8°, 53.8°, and 54.9° (2Θ) in the XRD pattern analysis, corresponding to the (101), (004), (200), (105), and (211) facets, respectively.

The transition metal tubular architectures of the present invention have been analyzed by scanning electron microscopy (SEM), transmission electron microscopy (TEM), Raman spectroscopy, X-ray photoelectron spectroscopy (XPS), and diffuse reflectance spectra, which show the presence of crystallinity in the transition metal tubular architectures of the present invention.

The transition metal tubular architectures can be doped with other elements from the periodic table of elements, so long as the dopant can be incorporated into the transition metal tubular architectures.

Examples of dopants include, but are not limited to, Boron, Aluminum, Gallium, Indium, Carbon, Silicon, Germanium, Tin, Nitrogen, Phosphorus, Arsenic, Antimony, Oxygen, Sulfur, Selenium, Tellurium, Vanadium, Niobium, Tungsten, Copper, Silver, and Gold.

Embodiment Two

Another embodiment of the present invention relates to methods of making an array of transition metal tubular architectures, wherein the transition metal tubular architectures are comprised of a transition metal oxide, sulfide, or selenide, and wherein transition metal tubular architectures are less than 100 nm in length as in Embodiment One.

These methods comprise oxidation of a transition metal in the presence of fluid medium that comprises an electrolyte, an acid, and a polymer. In preferred embodiments, the oxidation takes place during a galvanic anodization, where the fluid medium preferably surrounds an electrode on which anodization takes place. The composition of the fluid medium, described below, can influence the length of the transition metal tubular architectures, and the composition of the fluid medium herein is such that transition metal tubular architectures having the lengths described above, e.g. from 50 to less than 100 nm in length and the preferred values and variances given above are obtained.

The fluid medium can be a solvent, such as organic solvents. Non-limiting examples include water, alcohols, and amines, with specific non-limiting examples including methanol, ethanol, propanol, butanol, ethylene glycol, propylene glycol, and formamide. Mixtures of these solvents can be used, where the proportions are not particularly limited so long as oxidation and nanotube growth occurs.

In some embodiments of the present invention, the solvent comprising the fluid medium is either solely formamide or a mixture of formamide and an alcohol such as ethylene glycol. Without wishing to be bound to a particular theory, increasing the relative amount of the alcohol, from 0 vol % to 50 vol %, preferably results in shorter nanotubes. All real numbers between these minimum and maximum values are disclosed herein. Non-limiting examples of volume ratios include 50:50 formamide:alcohol, 60:40 formamide:alcohol, 65:35 formamide:alcohol, 70:30 formamide:alcohol, 75:25 formamide:alcohol, 80:20 formamide:alcohol, 85:15 formamide:alcohol, 90:10 formamide:alcohol, and 95:5 formamide:alcohol. In preferred embodiments, an increase in fluid medium viscosity leads to an increase in nanotube length.

As used herein, galvanic anodization relates to methods of oxidizing a metal with an electrochemical cell. Preferably, at least one electrode is substantially comprised of the transition metal that forms the transition metal tubular architectures of the present invention. In galvanic anodization, at least two electrodes are present in a fluid medium as part of the electrochemical cell, where the fluid medium comprises an electrolyte, an acid, and a polymer. As used herein, unless otherwise indicated, the term "substantially" means at least 85 mol % of the transition metal tubular architectures.

The oxidation reactions that form the transition metal tubular architectures as disclosed herein can be carried out for any length of time sufficient to form the transition metal tubular architectures, and the oxidation time period can change the length of the nanotubes. Generally, increased oxidation times leads to increased nanotube length. Accordingly, it is preferred to perform oxidation long enough to form transition metal tubular architectures having the lengths described above, e.g. from 50 to less than 100 nm in length and the preferred values and variances given above. Non-limiting examples of oxidation time from 30 minutes to 200 minutes, preferably from 45 minutes to 180 minutes, e.g. 180 minutes.

In some embodiments, an electrode is the anode and another electrode is the cathode, where the anodic cell and the cathodic cell comprise a fluid medium and the cells are isolated from each other. In these embodiments, an electrolyte bridge connects the anodic cell or cells to the cathodic cell or cells.

In other embodiments, an electrode is the anode and another electrode is the cathode, where the anodic cell and the cathodic cell each comprise a fluid medium and each cell is isolated from each other. In these embodiments, a polymeric, electrolyte membrane separates the anodic cell or cells from the cathodic cell or cells.

As used herein, unless otherwise indicated, the electrolyte is not particularly limited unless the electrolyte is insufficient to promote the oxidation of the metal. In preferred embodiments, the electrolyte comprises at least one a halide of an alkali metal (Li, Na, K, Rb, Cs, Fr) or alkaline earth metal (Be, Mg, Ca, Sr, Ba, Ra), a carbonate or bicarbonate of an alkali metal or alkaline earth metal, quaternized nitrogen compounds of halides, ammonium halides. As used herein, halides refer to a fluoride, a chloride, a bromide, and/or an iodide. In preferred embodiments, the electrolyte comprises a fluoride salt. In the most preferred embodiments, the electrolyte is $NH_4F$.

The amount of electrolyte is not particularly limited so long as the oxidation of the transition metal(s) proceeds. In preferred embodiments, the amount of electrolyte, relative to the entire amount of the fluid medium, is from 0.01 to 5 wt %, more preferably from 0.1 to 3 wt %, more preferably from 0.5 to 1.5 wt %. In the most preferred embodiments, the amount of electrolyte is from 0.75 to 1.1 wt %, such as 1 wt %. All real numbers between these minimum and maximum values are disclosed herein.

In some embodiments, the amount of electrolyte can change the thickness of the walls of the transition metal tubular architectures. The amount is not particularly limited, preferably it is present in the amounts described above, so long as the oxidation of the transition metal(s) proceeds and suitable wall thicknesses are achieved.

The wall thicknesses can be from 3 nm to 10 nm, preferably from 3 nm to 5 nm, and the variances of thickness can be ±0.05 nm, preferably *0.01 nm. All real numbers between these minimum and maximum values are disclosed herein.

The fluid medium can comprise one of the above-described electrolytes or the fluid medium can comprise at least two of the above-described electrolytes. Preferably, oxidation occurs after the fluid medium is prepared by a user, directly or through machine aided processes.

The polymer present in the fluid medium is not particular limited so long as the oxidation proceeds and transition metal tubular architectures are obtained. In preferred embodiments, the polymer is polyvinylpyrrolidone (PVP). Without wishing to be bound to a particular theory, the polymer is believed to promote the formation of the crystalline structure of transition metal tubular architectures. In preferred embodiments, the amount of polymer, relative to the entire amount of the fluid medium, is from 0.01 to 5 wt %, more preferably from 0.1 to 3 wt %, more preferably from 0.5 to 1.5 wt %. In the most preferred embodiments, the amount of polymer is from 0.75 to 1.1 wt %, such as 1.1 wt %. All real numbers between these minimum and maximum values are disclosed herein.

The molecular weight of the polymer is not particular limited so long as the oxidation of the transition metal proceeds and crystalline transition metal tubular architectures are obtained. In preferred embodiments, the molecular weight of the polymer is from 20,000 g/mol to 1,000,000 g/mol, more preferably from 30,000 g/mol to 800,000 g/mol, more preferably from 35,000 g/mol to 650,000 g/mol. All values between these minimum and maximum values are suitable for the invention. In some embodiments, the molecular weight has values of ±1000 g/mol.

In some embodiments, the polymer is a PVP having a molecular weight of 40,000 g/mol, an example of this polymer being 40,000 g/mol PVP from Loba Chemie.

The fluid medium can comprise one of the above-described polymers or the fluid medium can comprise at least two of the above-described polymers.

The acid present in the fluid medium is not particular limited so long as the oxidation proceeds and transition metal tubular architectures are obtained. Non-limiting examples of the acid include hydrochloric acid, hydrobromic acid, acetic acid, formic acid, trichloroacetic acid, oxalic acid, sulfurous acid, phosphoric acid, and nitrous acid. Most preferably, the acid is acetic acid. The acid can be added to the fluid medium in the form of aqueous concentrations of the acid, for example, from 0.01M to 5M, more preferably from 0.1M to 1M.

The amount of the acid or aqueous concentration thereof is not particularly limited so long as the pH of the fluid medium is sufficient for oxidation to proceed and transition metal tubular architectures are obtained. In preferred embodiments, the amount of acid or aqueous concentration thereof in the fluid medium is from 0.01 to 5 wt %, more preferably from 0.1 to 3 wt %, more preferably from 0.1 to 1.5 wt %. In the most preferred embodiments, the amount of acid or aqueous concentration there is from 0.1 to 0.5 wt %, such as 0.35 wt %. All real numbers between these minimum and maximum values are disclosed herein.

The pH of the fluid medium for these concentrations is preferably from 2 to 6.9, more preferably from 3 to 6, even more preferably from 3 to 5, for example, 4. When the transition metal of the transition metal tubular architectures is comprised of titanium, preferably in an amount of at least 50 mol % relative to 100 mol % of the transition metals, and titanium oxide is formed during oxidation, the pH of the fluid medium is preferably from 3 to 5. All real numbers between these minimum and maximum values are disclosed herein.

The fluid medium can comprise one of the above-described acids or aqueous concentrations thereof or it can comprise at least two of the above-described acids or aqueous concentration thereof.

The temperature of the reaction environment in which the oxidation reaction takes place is not particularly limited so long as the oxidation proceeds and transition metal tubular architectures are obtained. The amperage, in the case of anodization, is from 5 to 30 milliamps ("mA"), more preferably from 7 to 25 mA, more preferably from 10-20 mA, more preferably from 10-15 mA and the temperature of oxidation should be set at a value that does not promote significant amperage fluctuations. Amperage fluctuation is preferably ±1.0 mA, more preferably ±0.5 mA, even more preferably ±0.1 mA. All real numbers between these minimum and maximum values are disclosed herein.

In preferred embodiments of the present invention, amperage is set between the range of 5 to 30 mA, as described above, by ramping the voltage applied to the oxidation reaction, e.g., during galvanic anodization, from 0 to 50 V. All real numbers between these minimum and maximum values are disclosed herein. As used herein, the term "ramping" refers to a change from one voltage value to another, for example increasing the voltage from 0 V to 50 V overtime. Ramping can increase the voltage or decrease the voltage over time. Ramping can also be carried out in one, two, or more stages, where stage one exhibits ramping between at least two voltage values, stage two exhibits ramping between at least two other voltage values, and this ramping occurs for each stage. The ramping per stage can be an increase in voltage or a decrease in voltage, or both.

In the most preferred embodiments, the voltage is ramped in one, two, or more stages so that the amperage during oxidation stays between 5 to 30 mA. Preferably, the ramping for each stage occurs at a rate of from 1 to 10 V/min, preferably from 1.5 to 8 V/min, more preferably from 1.6 to 7 V/min, where this rate can be positive for an increase in voltage and negative for a decrease in voltage. All real numbers between these minimum and maximum values are disclosed herein.

In some embodiments, the voltage applied during oxidation as described above can influence the length, diameters and wall thicknesses of the transition metal tubular architectures. In general, greater voltages lead to higher nanotube growth rates and longer nanotubes, and longer oxidation times generally lead to longer nanotubes. The diameters are not particularly limited, so long as the transition metal tubular architectures form. Oxidation time, such as anodization time, can affect the wall thicknesses. In general, longer oxidation times result in greater diameters and thinner walls.

The diameters can be from 5 to 50 nm, preferably from 10 to 40 nm, more preferably from 15 to 30 nm, e.g. 20 nm, and the variances of diameters can be ±5 nm, preferably ±3 nm, most preferably ±1.5 nm. All real numbers between these minimum and maximum values are disclosed herein.

The wall thicknesses can be from 3 nm to 10 nm, preferably from 3 nm to 5 nm, and the variances of thickness can be ±0.05 nm, preferably ±0.01 nm. All real numbers between these minimum and maximum values are disclosed herein.

The temperature of the reaction environment in which oxidation occurs should be a temperature in which the current minimally fluctuates during the oxidation reaction. In preferred embodiments, the temperature of the reaction environment in which the oxidation reaction takes place is from −50° C. to 30° C., more preferably from −25° C. to 30° C., even more preferably from −5° C. to 27° C. All values included within these ranges are suitable for the invention. In one embodiment, these temperatures are controlled by thermal contact of the electrolytic cell to a temperature controlled bath.

In some embodiments, temperature of the reaction environment is room temperature. In other embodiments, the temperature of the reaction environment is 0° C. and can fluctuate from this temperature during oxidation by ±0.5° C., more preferably ±0.1° C.

Without wishing to be bound to a particularly theory, it is believed that temperature fluctuations, particularly at temperatures at or above room temperature, can result in large current fluctuations during the oxidation reaction. Such large current fluctuations can reduce the crystallinity of the transition metal tubular architectures. In one embodiment, the large current fluctuations are preferably mitigated by controlling the temperature of the environment in which oxidation takes place.

The way in which the current fluctuations are controlled is not particularly limited, so long as current fluctuations are controlled. In some embodiments, the oxidation reaction is carried out in an electrochemical cell that is immersed in a fluid medium set to a temperature of −50° C. to 30° C., more preferably from −25° C. to 30° C., even more preferably from −5° C. to 27° C., with all real numbers included within these ranges disclosed herein. Non-limiting examples of the fluid medium include a liquid water bath and an ice bath.

Alternatively, the current can be controlled by a current controlled voltage source, which controls the current and limits fluctuations in the current across the anodic cell and the cathodic cell. An example of current controlled voltage source is a current control unit known in the art.

In some embodiments, the methods further comprise cleaning electrodes of the electrochemical cell with ultrasonic vibration prior to being placed in the electrochemical cell. The cleaning with ultrasonic vibration preferably occurs in the presence of a solvent such as acetone. The frequencies of sonic vibration can be at greater than or equal to 20 kHz.

In some embodiments, the methods further comprise annealing the oxidized metal after the oxidation, which normally takes place by galvanic anodization, to form the transition metal tubular architectures. This annealing can take place at room pressure, under vacuum, or under pressure, so long as the annealing is not inhibited. The temperature of annealing is preferably from 200° C. to 600° C., where the time period for annealing is not particularly limited. The temperature can be changed during annealing, where the increase or decrease of the temperature can occur at a rate of from 0.5 to 5° C./min, with all real numbers between these minimum and maximum values Annealing can take place in oxygen or air.

In the present invention, for those embodiments where zirconium is the transition metal, the cell solution present during oxidation does not necessarily include PVP.

In other embodiments of the processes disclosed herein, the processes further comprising doping the transition metal tubular architectures with other elements from the periodic table of elements, so long as the dopant can be incorporated into the transition metal tubular architectures.

Examples of dopants include, but are not limited to, Boron, Aluminum, Gallium, Indium, Carbon, Silicon, Germanium, Tin, Nitrogen, Phosphorus, Arsenic, Antimony, Oxygen, Sulfur, Selenium, Tellurium, Vanadium, Niobium, Tungsten, Copper, Silver, and Gold.

The process element of doping the transition metals can be carried out in several ways. In one embodiment, the dopant is added to the fluid medium in the form of a salt, so long as the salt is sufficiently miscible in the fluid medium and the dopant can be incorporated into the architectures.

In another embodiment of this doping, the transition metal tubular architectures, after they are made, are immersed in a fluid containing a dopant and the solution is heated and another anodization is performed.

Embodiment Three

Another embodiment of the present invention relates to methods of splitting water in the presence of an array of transition metal tubular architectures, wherein the transition metal tubular architectures are comprised of a transition metal oxide, sulfide, or selenide, and wherein transition metal tubular architectures are less than 100 nm in length according to Embodiment One. Unless otherwise indicated, the phrase "an array of transition metal tubular architectures of sub-100 nm in length" used in this embodiment refers to the an array of transition metal tubular architectures, wherein the transition metal tubular architectures are comprised of a transition metal oxide, sulfide, or selenide, and wherein transition metal tubular architectures are less than 100 nm in length according to Embodiment One.

As used herein, the term "splitting water" refers to oxidation of oxygen and reduction of hydrogen in water molecules to produce $H_2$ and $O_2$. This process is described as:

$$2H_2O \rightarrow O_2 + 4H^+ + 4e^-$$

$$4H^+ + 4e^- \rightarrow 2H_2$$

$$2H_2O \rightarrow 2H_2 + O_2$$

The method of splitting water comprises contacting a photoanode or a photocathode with light, said photoanode or said photocathode comprising or having an array of transition metal tubular architectures, wherein the transition metal tubular architectures are comprised of a transition metal oxide, sulfide, or selenide, and wherein transition metal tubular architectures are less than 100 nm in length according to Embodiment One on a surface of the photoanode or the photocathode, said photoanode or photocathode being immersed in water. The light of this contacting is not particularly limited, so long as it provides energy to the photoanode or photocathode sufficient to split water. The wavelength of light suitable for use is from 10 nm to 1,000,000 nm, and the wavelength applied to the photoanode or photocathode can be a single wavelength or a spectrum of wavelengths such as sunlight.

The device in which water splitting occurs is not particularly limited, so long as the photoanode or photocathode has present thereon an array of transition metal tubular architectures of sub-100 nm in length according to the present invention. Preferably, the device comprises the photoanode or photocathode described above, which comprises an array of transition metal tubular architectures of sub-100 nm in length according to the present invention present on a surface of the photoanode or photocathode. The device also comprises a counter anode that is connected to the photoanode or photocathode by any connection medium capable of forming a circuit between the photoanode or photocathode and the counter electrode.

The counter electrode comprises any material that allows the counter anode to function in the device and participate in water splitting. One example is a counter anode that comprises platinum. Platinum is preferably at least 75% atomic percent of the counter anode in terms of material of which the counter anode is comprised.

Additional electrodes can be included in the device as necessary. One example is a Ag/AgCl electrode, useful as a reference electrode.

The device comprises water to immerse the photoanode or photocathode.

In the devices of the present invention, the array of transition metal tubular architectures of sub-100 nm in length function as a semiconductor material, which preferably is contacted by light and provides energy to the device for splitting water. In embodiments of the present invention, the semiconductor material can further comprise at least one of Si, GaAs, GaP, InP, CdS, CdSe, CdTe, and ZnO, present in an amount of no greater than 15 mol %, relative to the total number of moles of the semiconductor material.

The array of transition metal tubular architectures of sub-100 nm in length is present on at least 50% of the surface area of the photoanode, preferably at least 60% of the surface area, more preferably at least 75% of the surface area, even more preferably at least 90% of the surface area, and most preferably 100% of the surface area of the photoanode. All real numbers between these minimum and maximum values are disclosed herein.

The devices can be used by those of ordinary skill in the art to extract molecular hydrogen and/or molecular oxygen by known or useful techniques available in the art.

Embodiment Four

Another embodiment of the present invention relates to a device that comprises an array of transition metal tubular architectures, wherein the transition metal tubular architectures are comprised of a transition metal oxide, sulfide, or selenide, and wherein transition metal tubular architectures are less than 100 nm in length according to Embodiment One.

Unless otherwise indicated, phrases such as "an array of transition metal tubular architectures of sub-100 nm in length," "the transition metal tubular architectures," and "transition metal tubular architectures of sub-100 nm in length" used in this embodiment refers to the an array of transition metal tubular architectures, wherein the transition metal tubular architectures are comprised of a transition metal oxide, sulfide, or selenide, and wherein transition metal tubular architectures are less than 100 nm in length according to Embodiment One.

Non-limiting examples of devices which can utilize the transition metal tubular architectures described above include drug delivery devices, lithium-ion batteries, photoelectrochemical devices, dye-sensitized solar cells (DSSCs), metal oxide field-effect transistors (MOSFETS), and hydrocarbon processing devices.

In drug delivery devices, the nanotubes can be loaded with drugs and injected in the body, where they can release the drug.

In lithium-ion batteries, the transition metal tubular architectures that are sub-100 nm in length are useful as anode materials for thin film lithium ion batteries. The transition metal tubular architectures can also be used as an active lithium ion storage material.

The dye catches photons of incoming light and uses their energy to excite electrons. The dye then injects this excited electron into the titanium dioxide. The electron is conducted away by the sub 100 nm nanotubes titanium dioxide. A chemical electrolyte in the cell then closes the circuit so that the electrons are returned back to the dye.

In hydrocarbon processing devices, the transition metal tubular architectures that are sub-100 nm in length are useful as catalysts during reactions that oxidizing hydrocarbons or produce hydrocarbons. One example is the use of the transition metal tubular architectures that are sub-100 nm in length as catalysts in reactions that convert carbon dioxide into natural gas and/or methane.

EXAMPLES

Example 1: Preparation and Isolation of Sub-100 nm Nanotubes of Titanium Dioxide ($TiO_2$)

Pure titanium foil samples (1 cm×1.5 cm) were first ultrasonically cleaned with acetone, followed by ethanol, then water for 20 minutes each. The anodization was performed in a two-electrode electrochemical cell, with the titanium foil as the working electrode and platinum foil as the counter electrode.

Figure 4A:
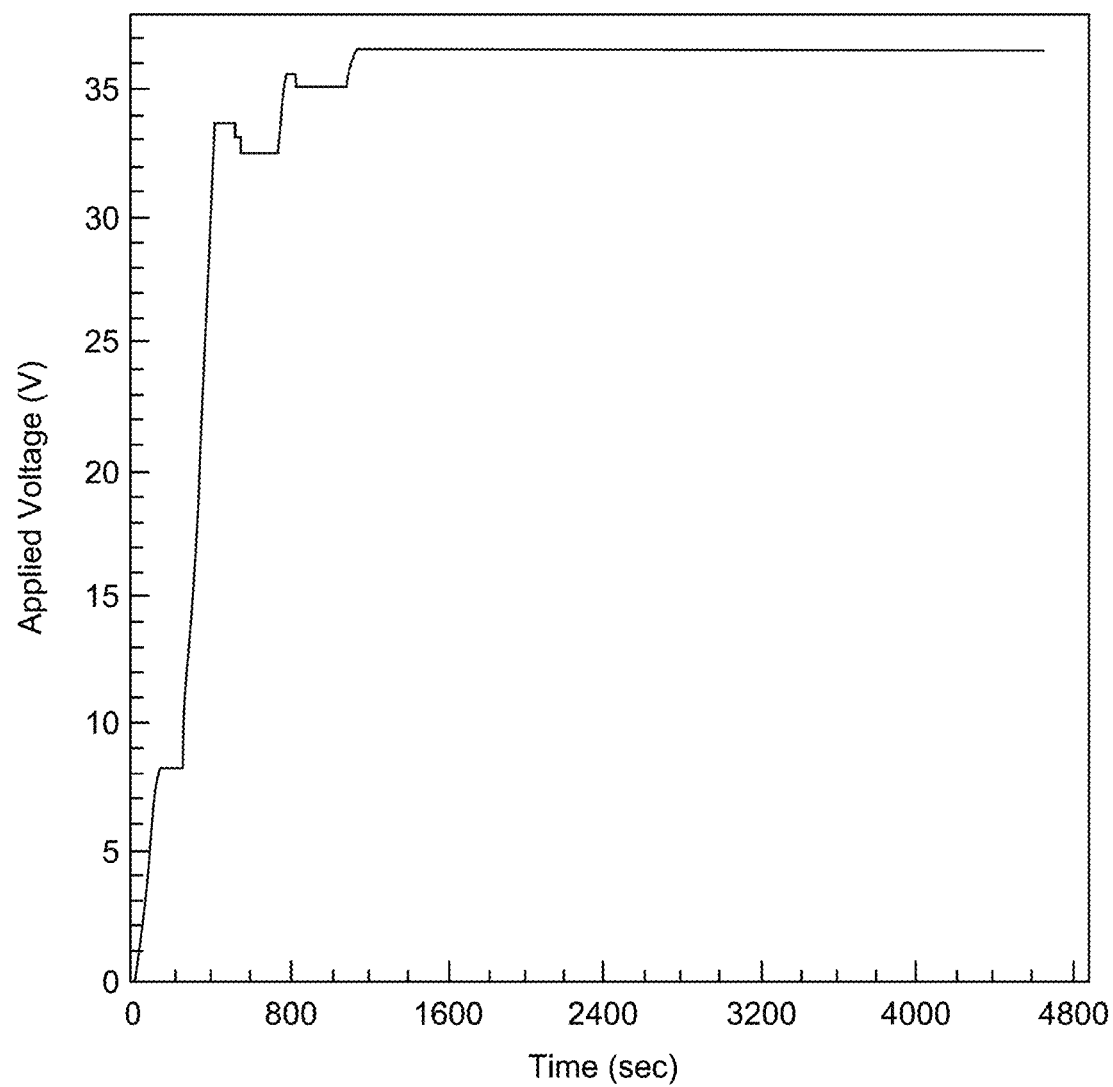
FIG. 4A shows the voltage versus time response during the anodization of Example 1.
Figure 4B:
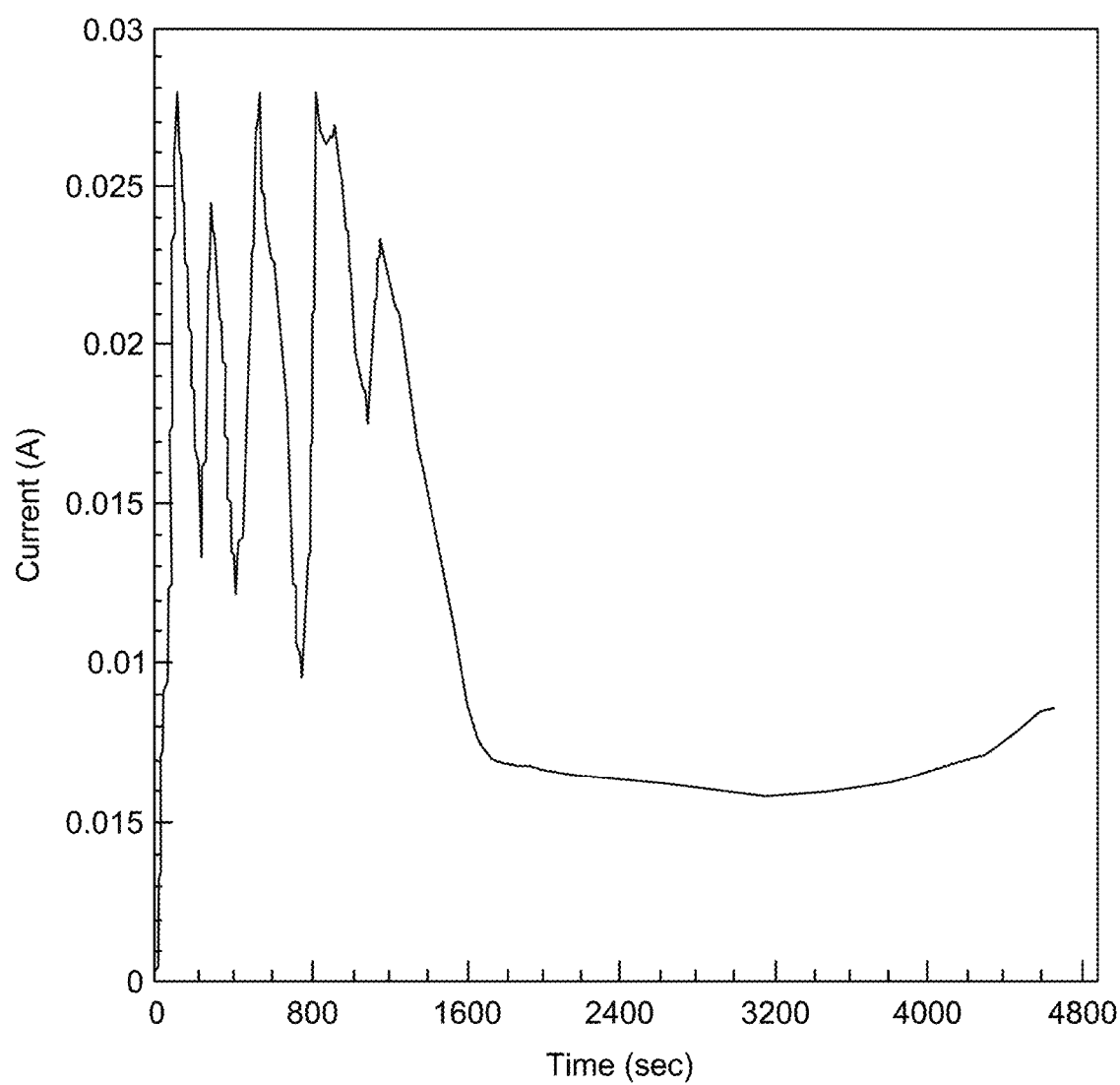
FIG. 4B shows the current-time response during anodization of Example 1.

Samples were anodized in electrolytes containing 1% $NH_4F$ (Sigma-Aldrich, ≥98%) mixed with 1.1 wt % Polyvinylpyrrolidone (M.W.~40,000 g/mol, Loba Chemie) and 0.75 wt % $H_2O$ in a formamide-based electrolyte using galvanostatic anodization method for 2.5 hours at 0° C. The voltage was increased from 0 V to 36.5 V over the course of anodization so that the amperage remained between 16 mA to 28 mA during anodization. See FIGS. 4a and 4b, which show voltage ramping and current change during anodization, respectively.

The pH of the electrolyte was controlled by the addition of 0.1 M acetic acid to the solution. Prior to anodization, the electrolyte was stirred for 1.15 h at 100° C. After anodization, the samples were rinsed thoroughly with distilled water. The as-anodized samples were crystallized by air annealing at 200° C., 350° C., 400° C., 450° C., and 500° C. for 2.5 h with a heating rate of 1° C./min.

FIG. 1 shows the scanning electron microscopy (SEM) images of the fabricated sub-100 nm $TiO_2$ tubular structures before and after annealing. FIG. 1a shows the SEM image of the as-anodized $TiO_2$ nanotubes with an average pore diameter of 20±3 nm and an average length of 70±10 nm. Note that previous attempts of galvanostatic anodization of titanium foil resulted in either porous nanostructures or long nanotubes (several microns). It is noteworthy to mention that, regardless of the anodization time (30-200 min), the resulting nanotubes were identical in terms of morphology, especially the tube length. Note also that the nanoarchitectures are reproducible whether the anodization is carried out at room temperature or in ice medium, yet the current is easier to control in the ice medium. Note also, as described above, the composition of the fluid medium can influence the length of the transition metal tubular architectures permitting a range of sub-100 nm $TiO_2$ tubular structures to be obtained varying from 5 nm to near 100 nm in length by variances in the composition of the fluid medium to those compositions detailed above.

Figure 1B:
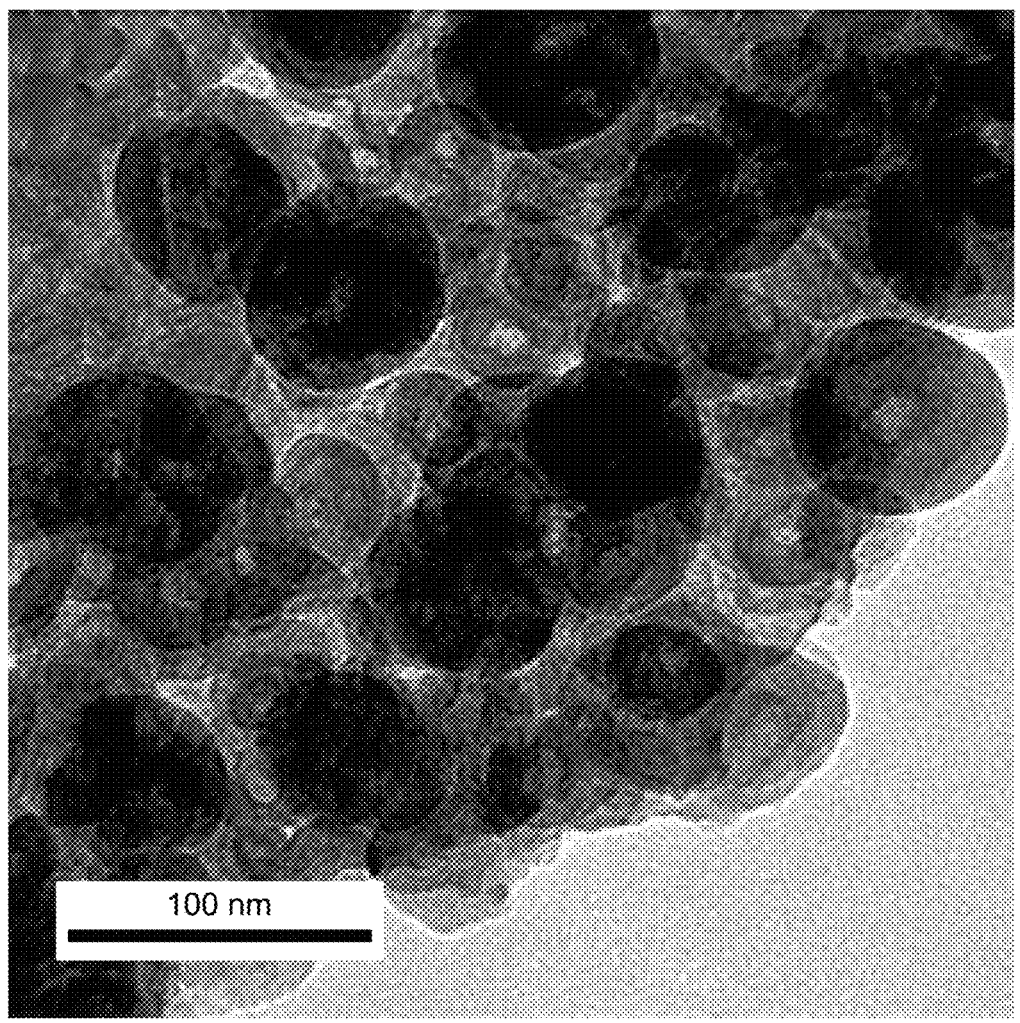
Figure 1C:
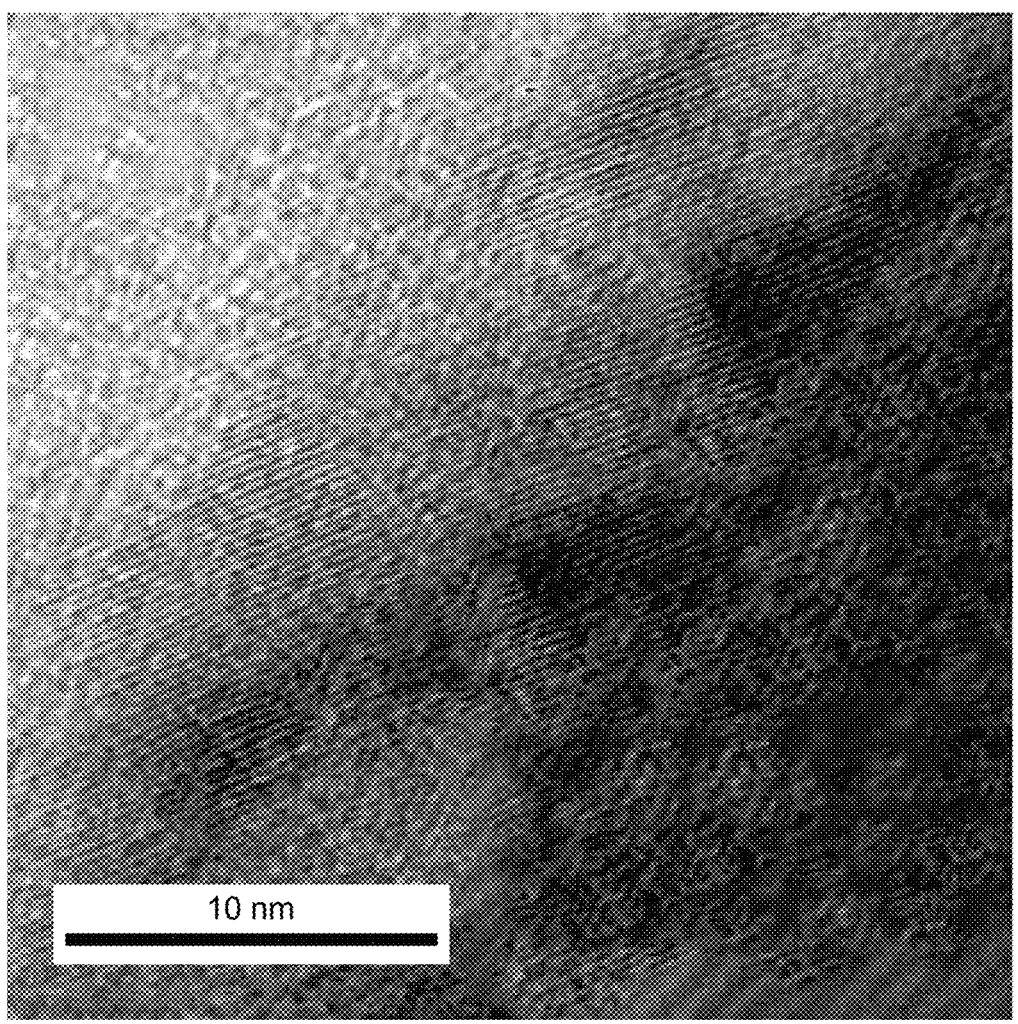
Figure 1D:
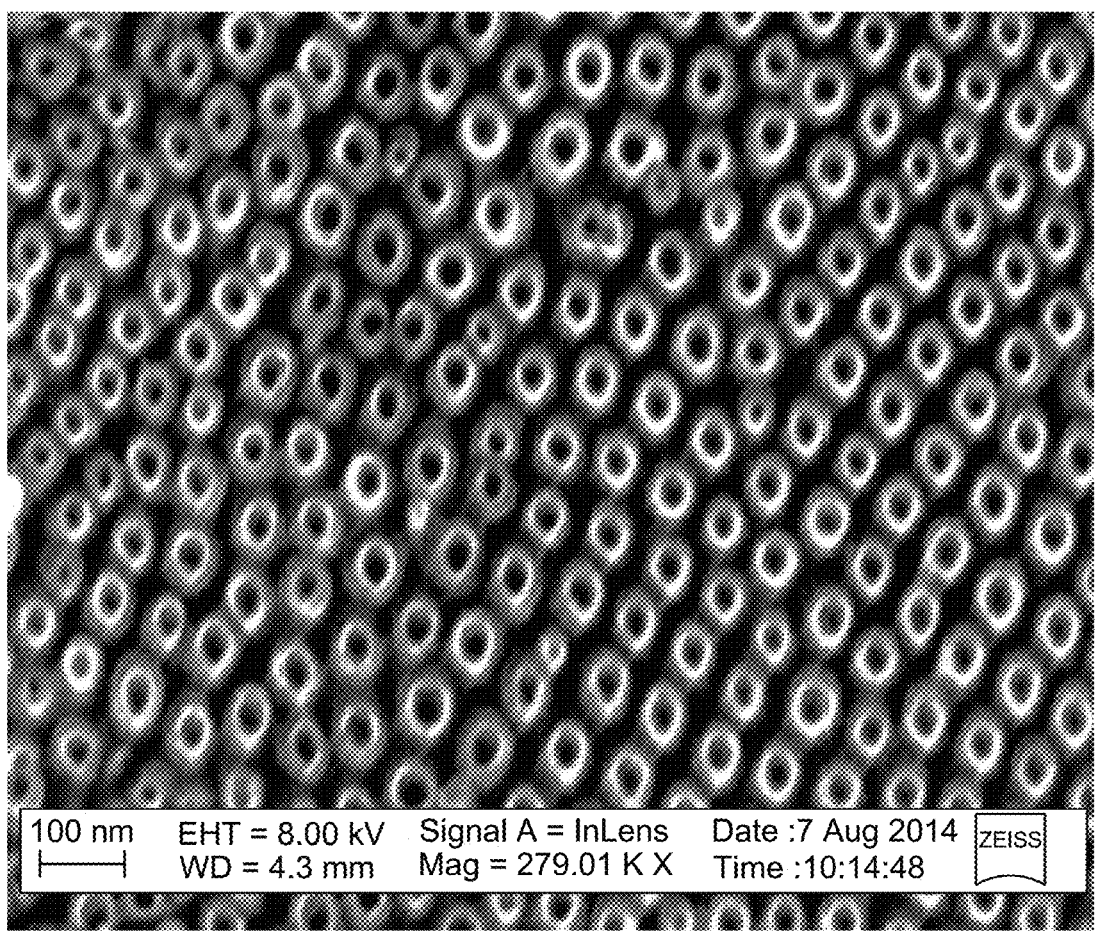
Figure 1E:
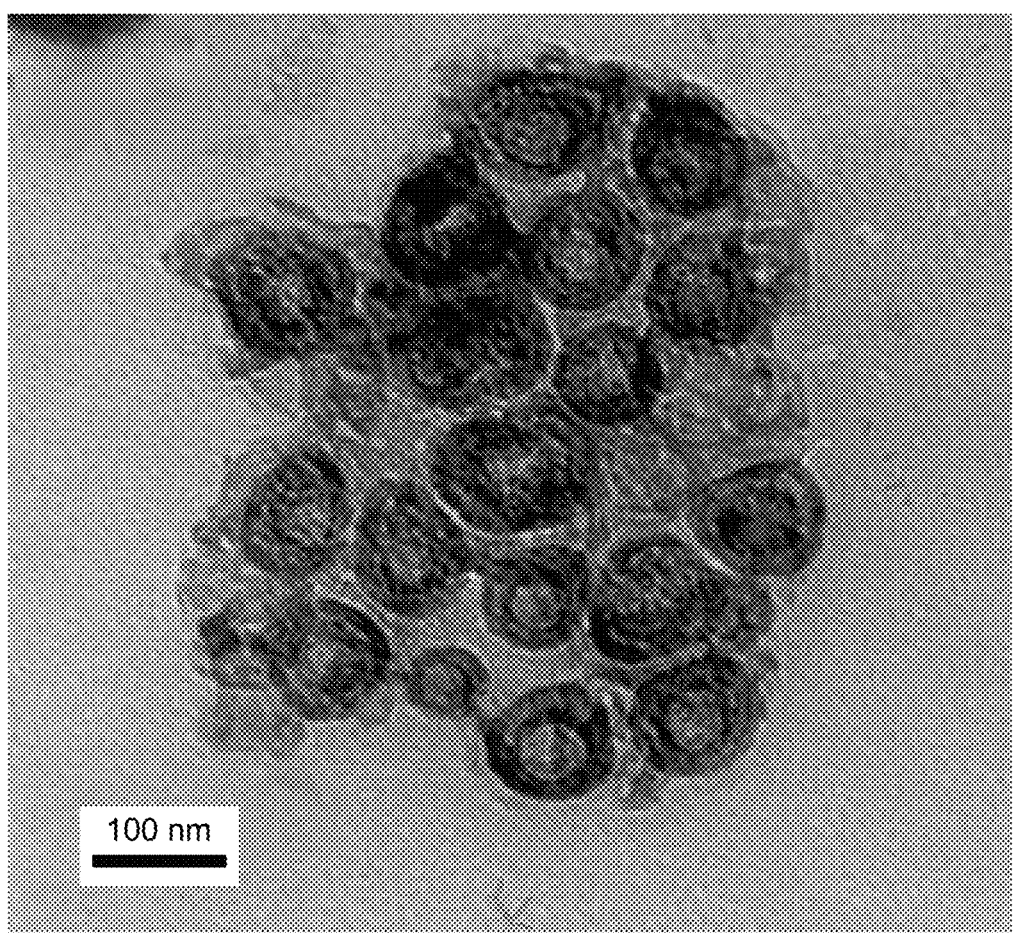
Figure 1F:
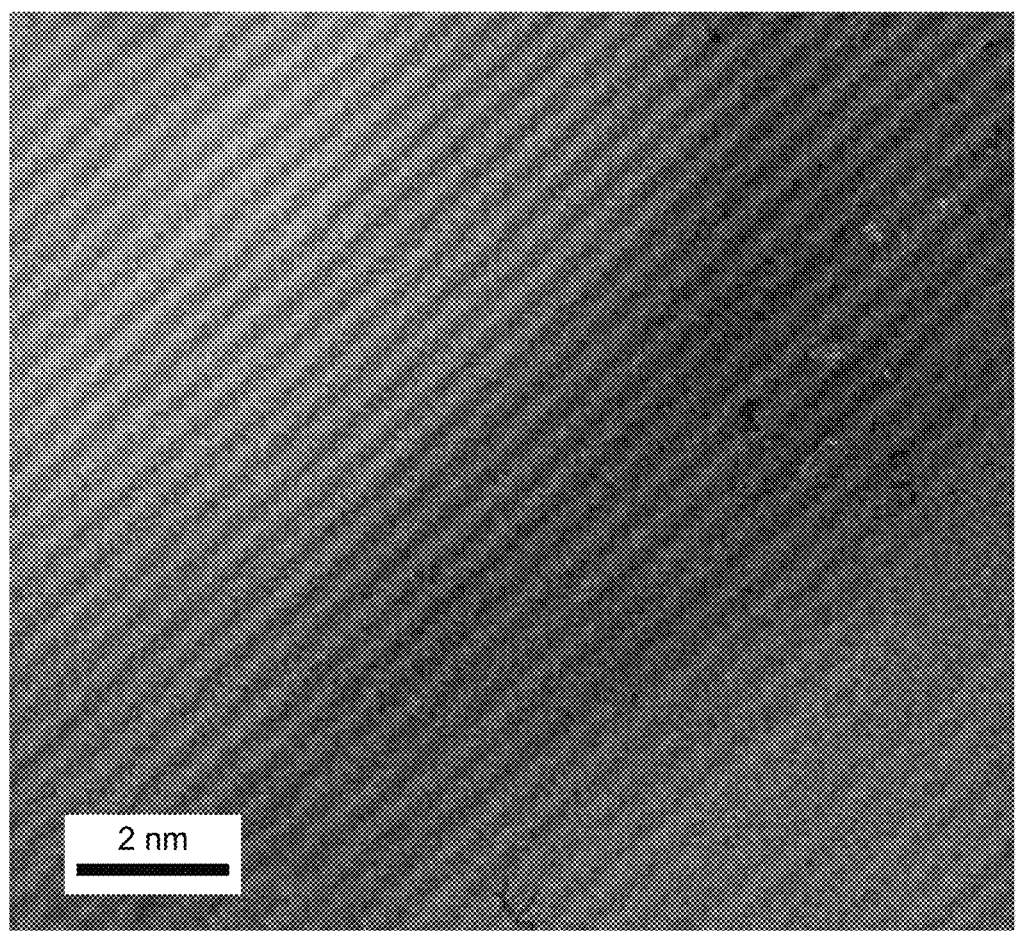

To further investigate the morphology of the sub-100 nm $TiO_2$ tubular structures, they were pealed-off the titanium foil and examined under the transmission electron microscope (TEM). The tubular shape of the as-anodized sub-100 nm structures was confirmed as shown in FIG. 1b. FIG. 1c shows the HR-TEM image of the as-anodized nanotubes, which reveals its partial crystallinity. The TEM and the HR-TEM images of the nanotubes annealed at 400° C. are shown in FIG. 1e,f, respectively. The inset in Figure if demonstrates the selected-area electron diffraction (SAED) pattern of the annealed nanotubes. The lattice distance shown in Figure if is 0.4 nm, corresponding to the anatase phase. Note that the nanotubes preserve their morphology after annealing, revealing their structural stability.

Figure 5A:
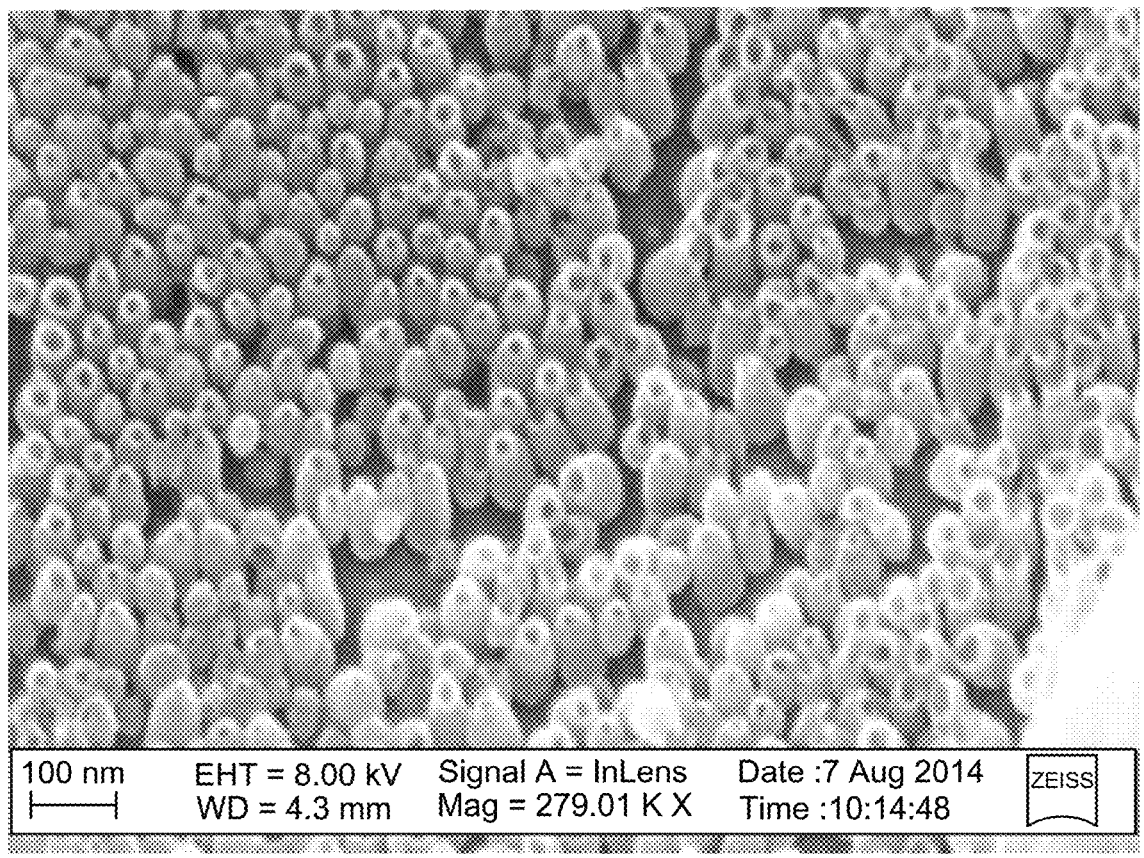
FIG. 5A shows an SEM image of sub-100 nm $TiO_2$ hollow nanotubes as anodized in Example 1.
Figure 5B:
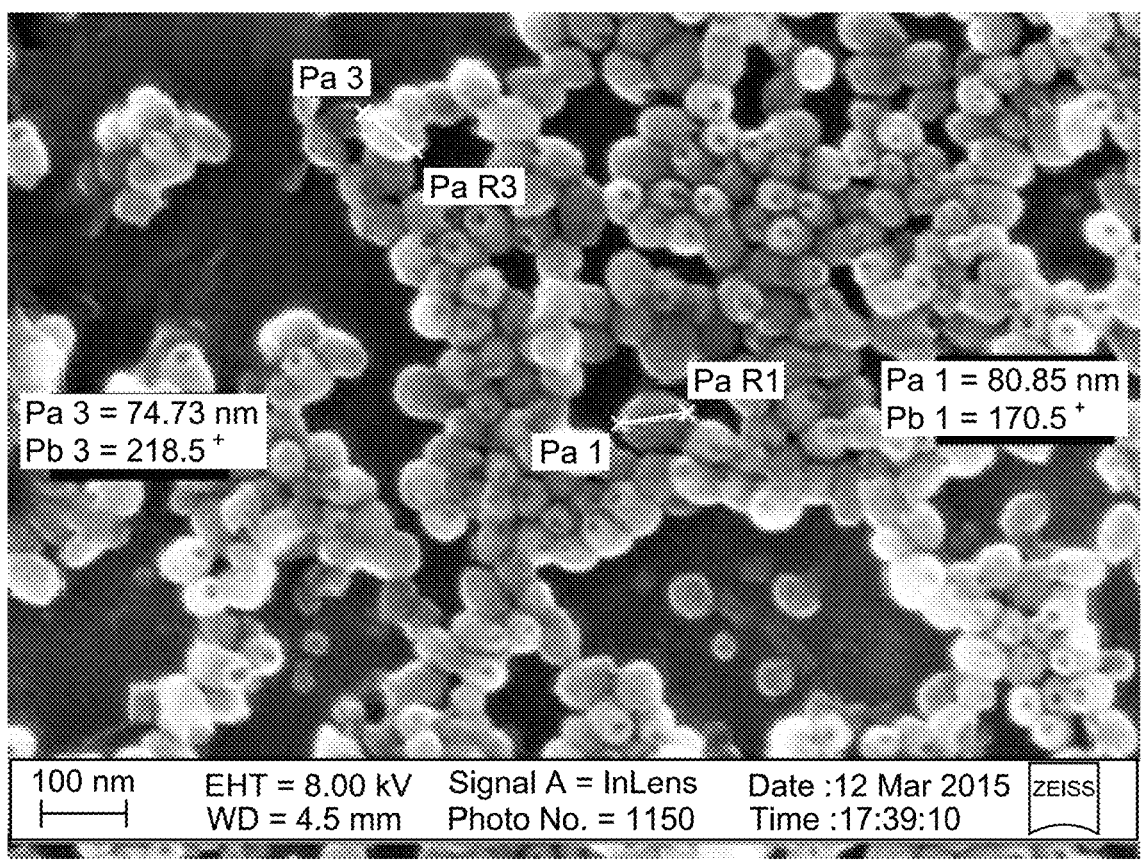
FIG. 5B shows an SEM image of sub-100 nm $TiO_2$ hollow nanotubes as anodized in Example 1 and shown in FIG. 5A but inverted on its side.
Figure 5C:
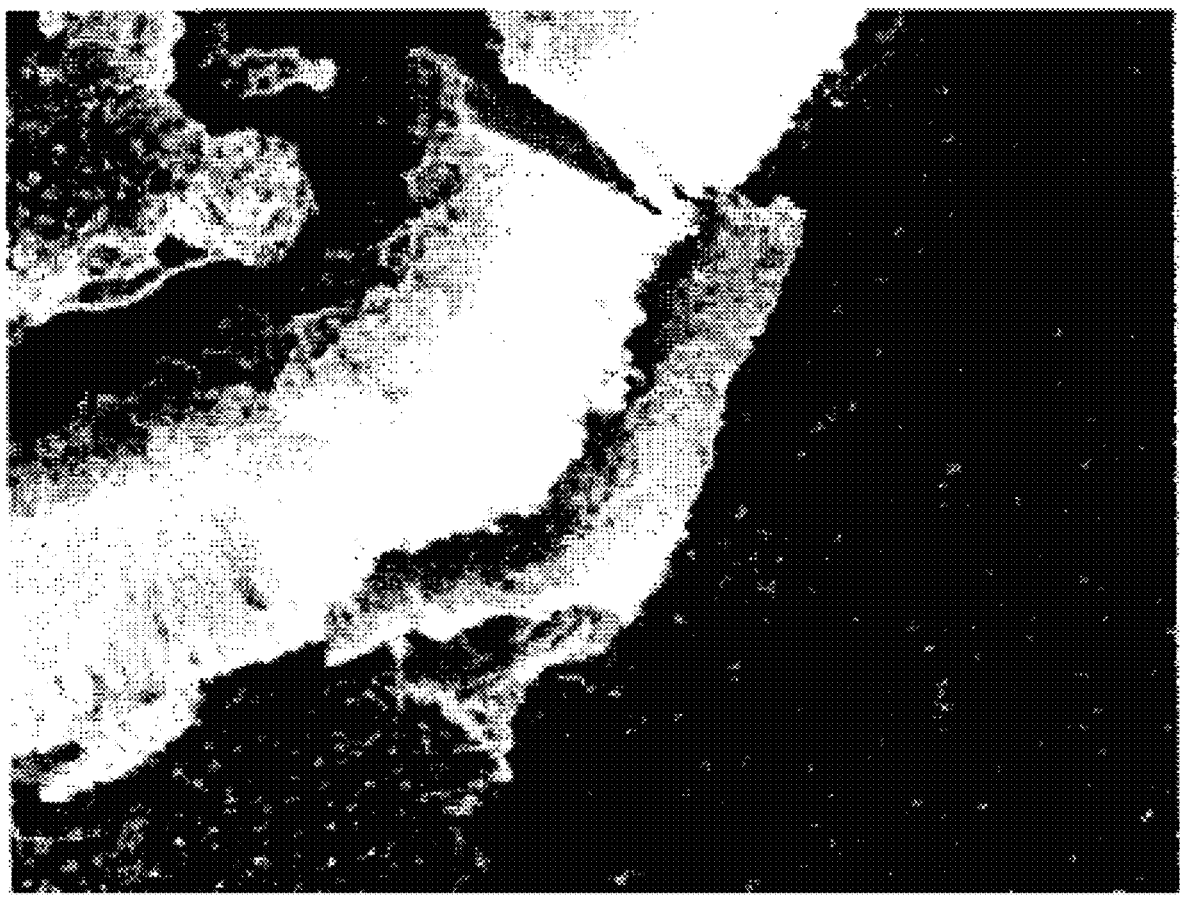
FIG. 5C shows an SEM image during the mechanism of formation of hollow nanotubular architectures of Example 1.

To get an insight into the mechanism of formation of the sub-100 nm tubular architectures, titanium foil was anodized for only 5 min. It was found that long nanotubes are first formed. Beneath the layer of long nanotubes lays the layer of interest of the sub-100 nm tubes. The voltage ramping caused the layer of long nanotubes to fall, exposing the layer of the sub-100 nm tubes, as shown in Figure 5c.

Without wishing to be bound to a particular theory, it is believed the thicknesses of the array (i.e., the length of the sub-100 nm tubular architectures) can be controlled by varying the proportions or constituents of the fluid medium such as the PVP, the ammonium fluoride, and the water content. For example, if shorter sub-100 nm tubes are desired, lower water contents are used during the overall anoxidation time. In that case during the formation of the "long nanotubes," the supply of oxidant to the subcutaneous layer of sub-100 nm tubes is reduced. If longer sub-100 nm tubes are desired, higher water contents are used. In that case, during the formation of the "long nanotubes," the supply of oxidant to the subcutaneous layer of sub-100 nm tubes is increased.

Figure 2A:
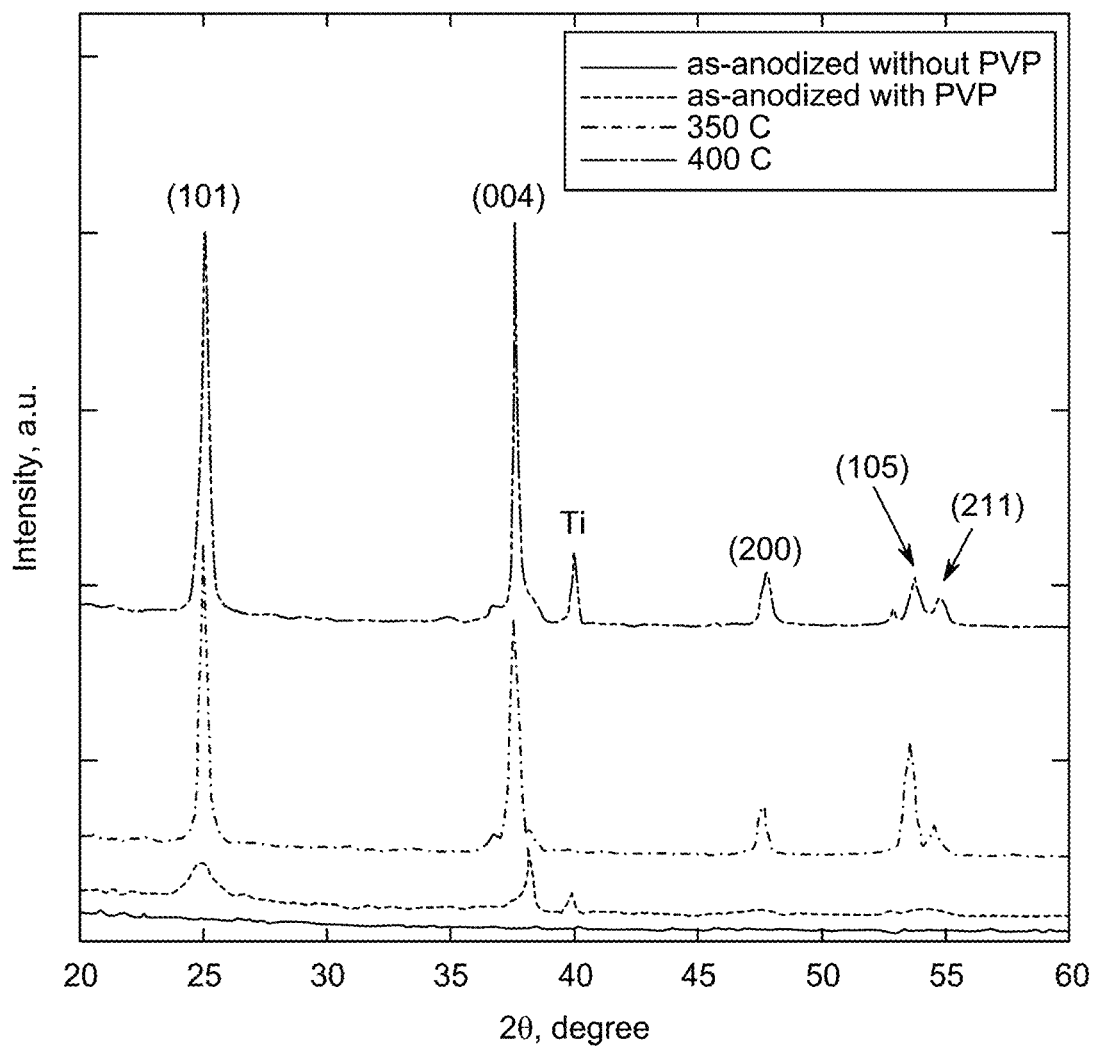
FIG. 2A shows the XRD patterns of the as-anodized and the annealed sub-100 nm $TiO_2$ tubular arrays.
Figure 6A:
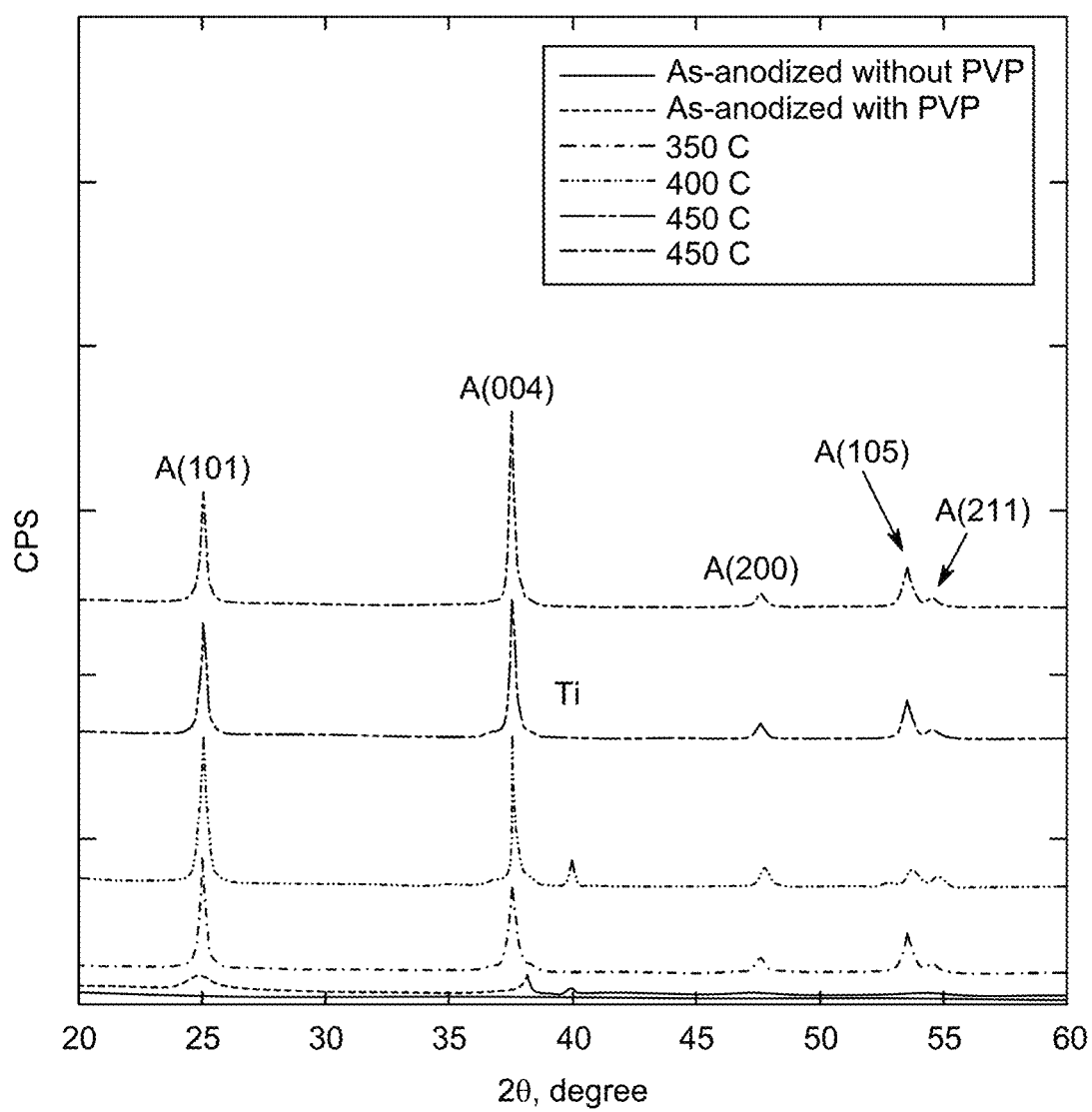
FIG. 6A shows a XRD pattern of sub-100 nm $TiO_2$ hollow nanotubes obtained from Example 1 before and after annealing.
Figure 6B:
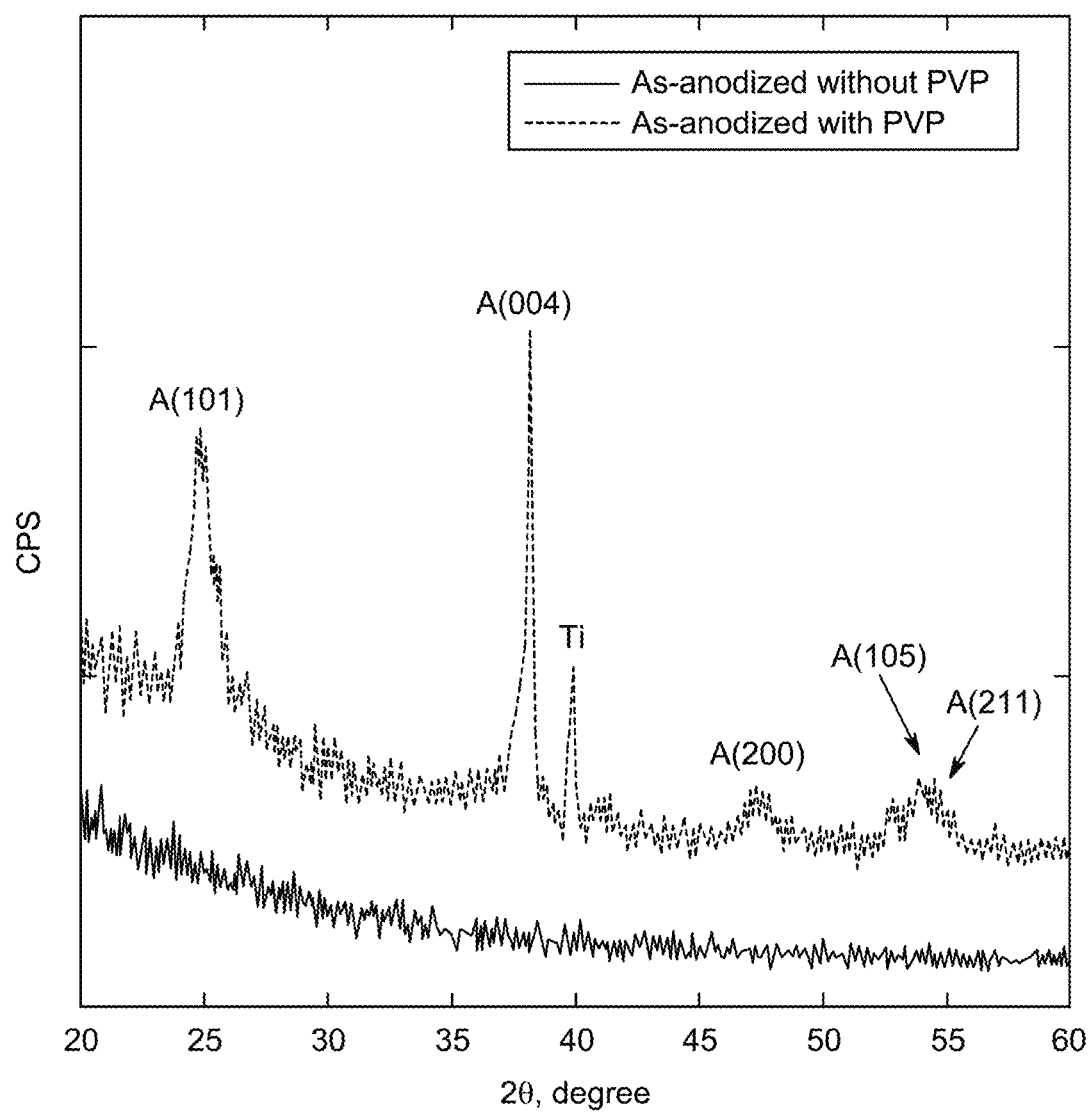
FIG. 6B shows a GAXRD pattern of sub-100 nm $TiO_2$ hollow nanotubes obtained from Example 1 before annealing.
Figure 7:
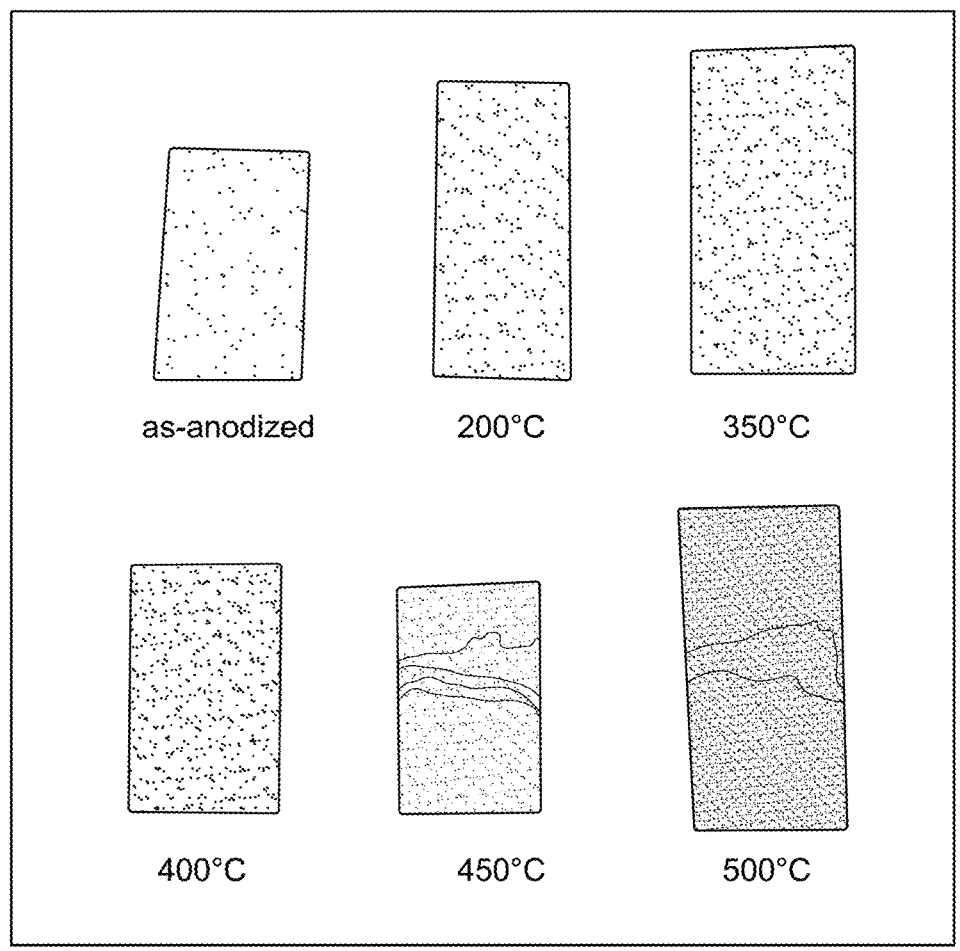
FIG. 7 shows a XRD pattern of sub-100 nm $TiO_2$ hollow nanotubes before and after annealing at temperatures of 400° C., 450° C., and 500° C.
Figure 8:
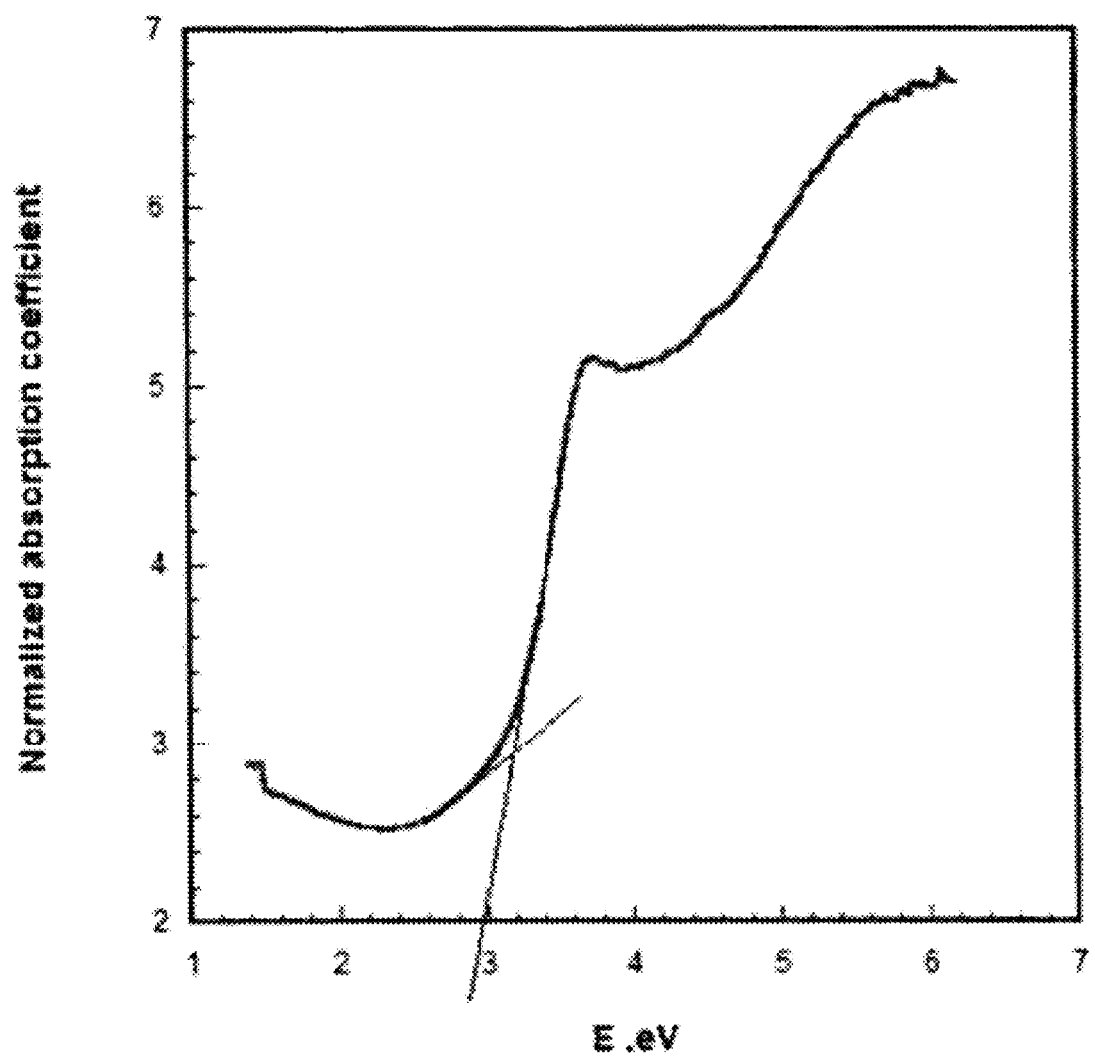
FIG. 8 shows a normalized absorption coefficient versus energy of the sub-100 nm $TiO_2$ hollow nanotubes from Example 1, annealed at 500° C.

The XRD patterns of the as-anodized and the annealed sub-100 nm $TiO_2$ tubular arrays are shown in FIG. 2a. The diffraction pattern shows the partial crystallinity of the as-anodized nanotubes fabricated in PVP-rich electrolytes (two diffraction peaks at 2θ=24.9° and 38°), while those fabricated in PVP-free electrolytes are totally amorphous. Therefore, the use of galvanostatic anodization in the presence of PVP not only permits the fabrication of sub-100 nm tubes but also improves the crystallinity of the material. The XRD pattern of the annealed samples confirms the crystallization of the sub-100 nm $TiO_2$ architectures in the regular anatase phase with the appearance of the characteristic diffraction peaks at 25.3°, 37.7°, 47.8°, 53.8°, and 54.9°, corresponding to the (101), (004), (200), (105), and (211) facets, respectively 31. Note the growth of the (004) peak intensity with the increase in the annealing temperature. Starting at 400° C., the (004) peak intensity starts to overgrow that of the (101), See FIGS. 6a and 6b.

Figure 5D:
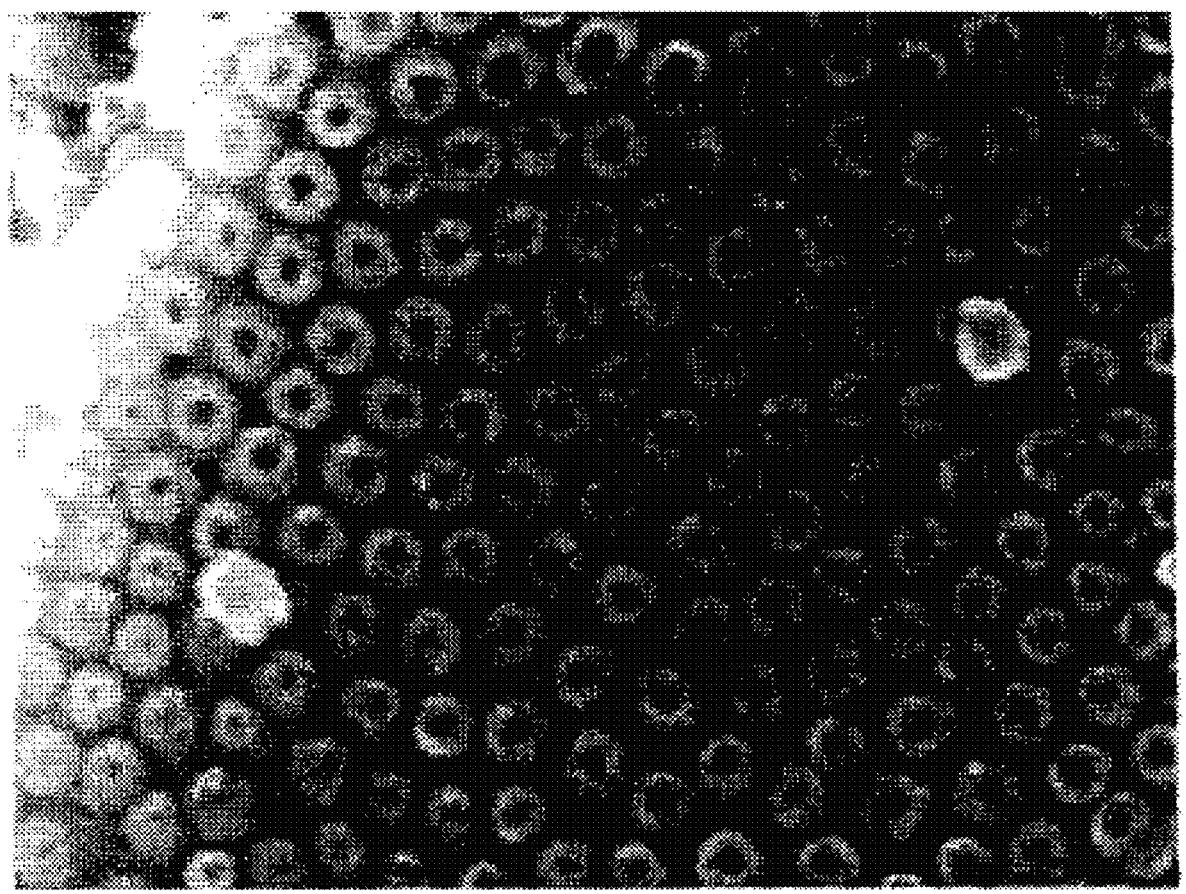
FIG. 5D shows an SEM image of sub-100 nm $TiO_2$ hollow nanotubes annealed at 350° C.
Figure 5E:
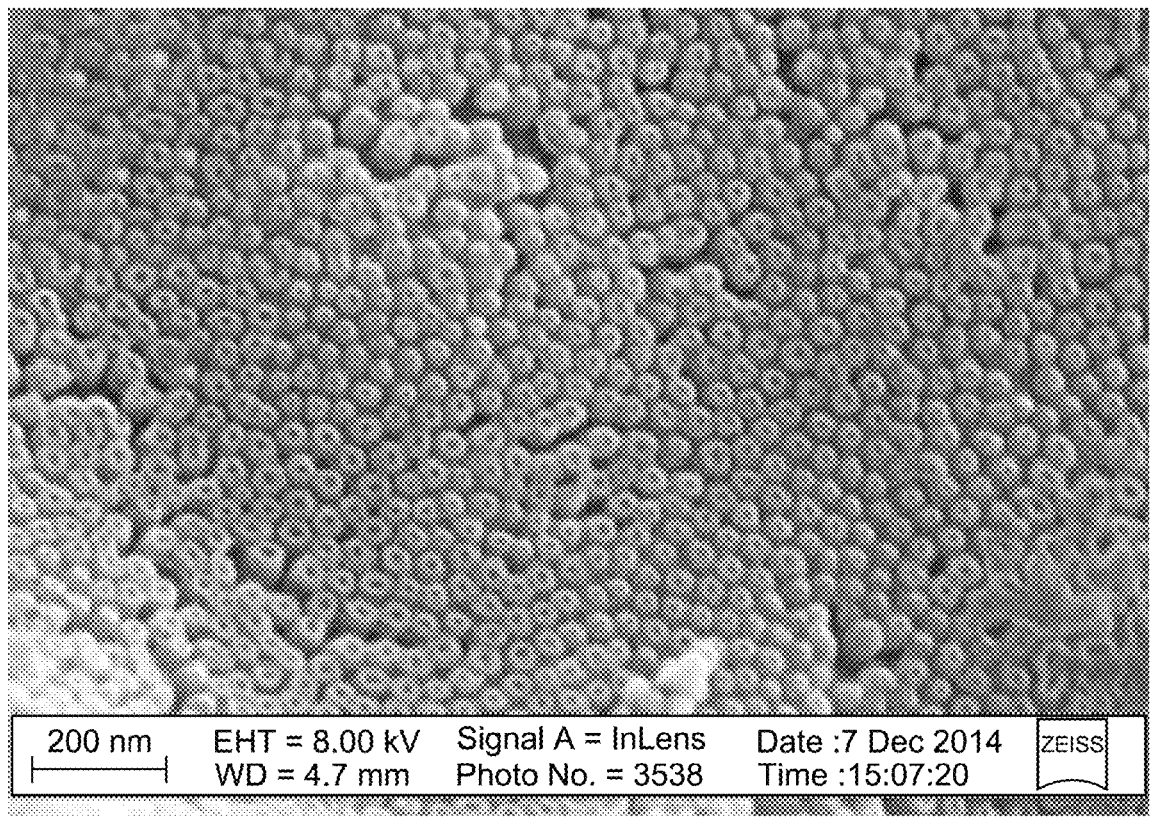
FIG. 5E shows an SEM image of sub-100 nm $TiO_2$ hollow nanotubes annealed at 400° C.
Figure 5F:
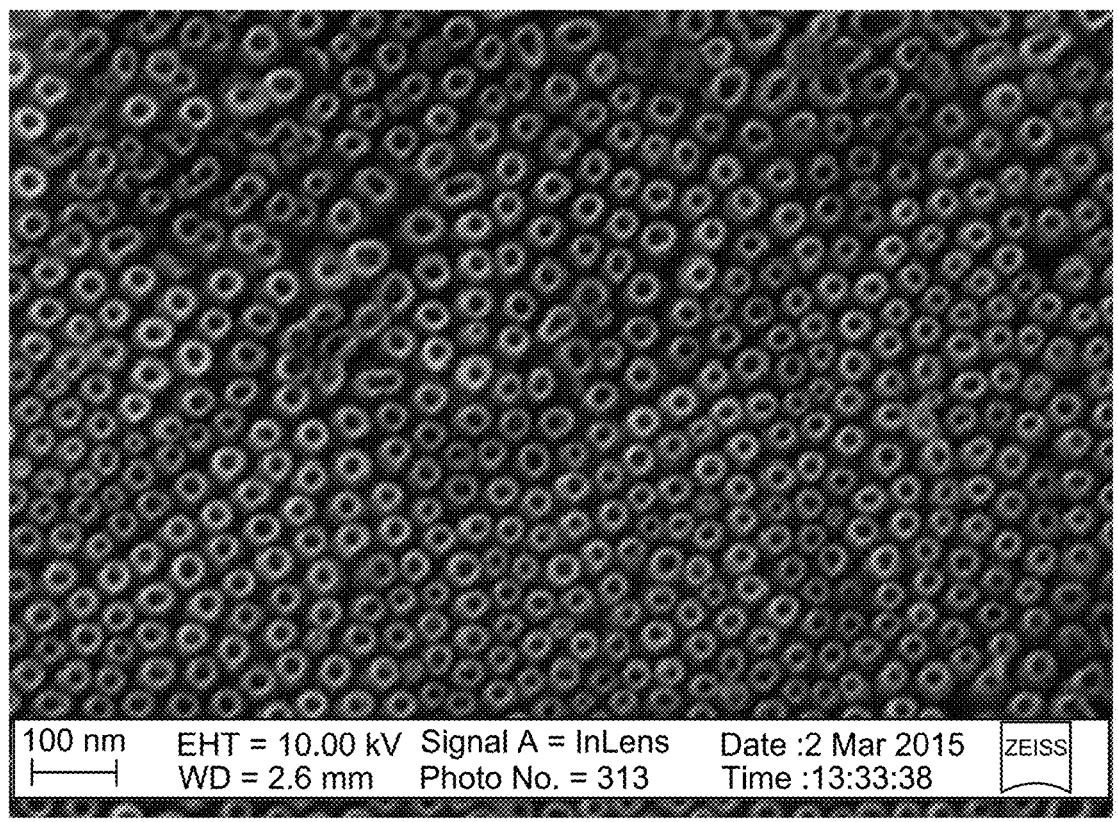
FIG. 5F shows an SEM image of sub-100 nm $TiO_2$ hollow nanotubes annealed at 450° C.
Figure 5G:
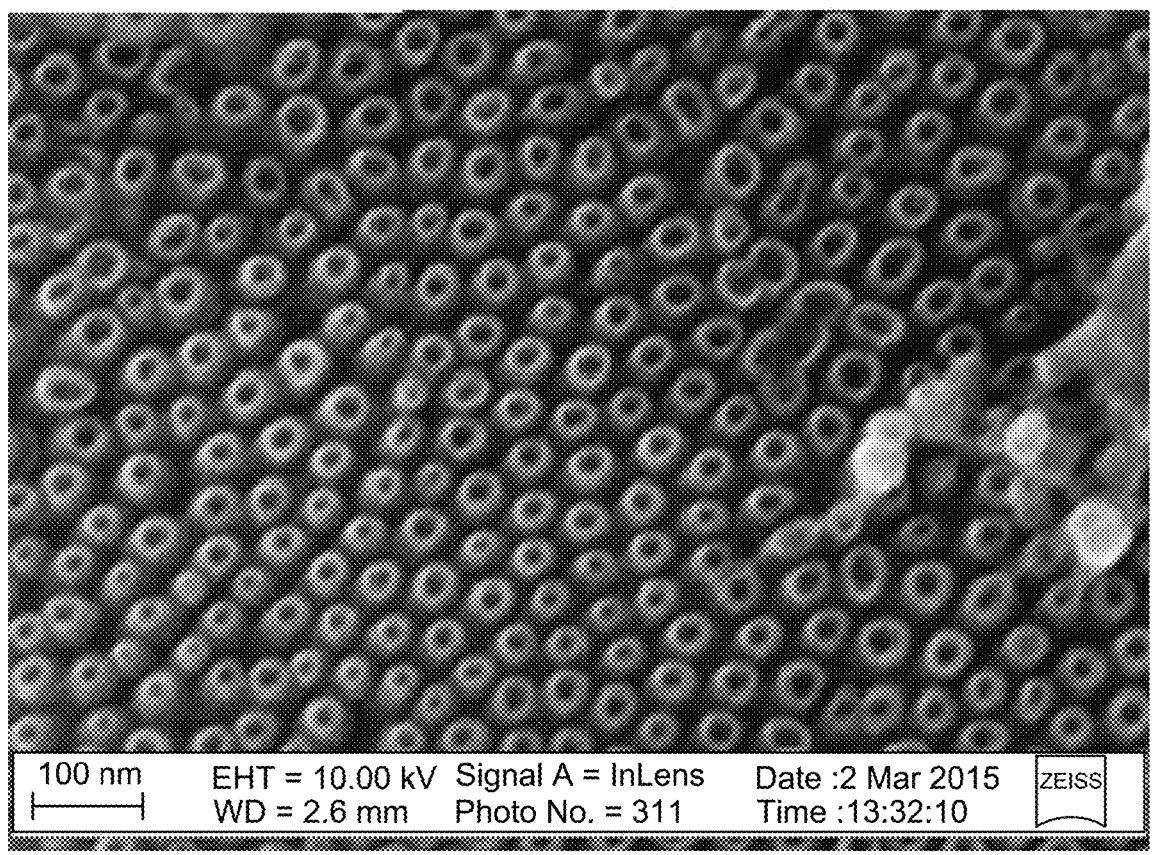
FIG. 5G shows an SEM image of sub-100 nm $TiO_2$ hollow nanotubes annealed at 500° C.
Figure 5H:
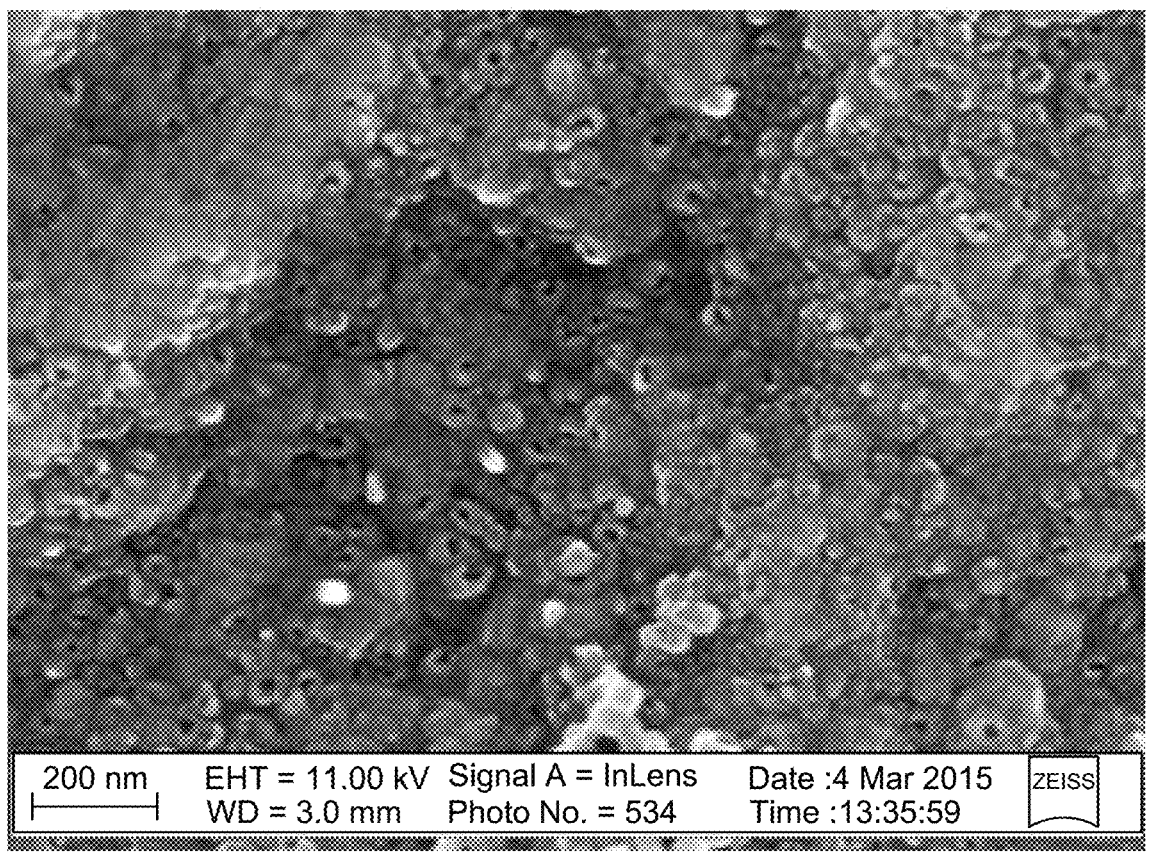
FIG. 5H shows an SEM image of sub-100 nm $TiO_2$ hollow nanotubes annealed at 600° C.

The crystallinity of the as-anodized sample is relatively low and the crystallite size is calculated to be ca. 6 nm according to the Scherrer equation from the broadening of anatase (101) reflection. Annealing at 350° C. and 400° C. greatly enhances the crystallinity of the material, however, with an increase in the crystallite size (ca. 9 nm). To get an insight into the stability of the material upon annealing, FIGS. 5*d* and 5*h* shows the SEM images of the annealed sub-100 nm $TiO_2$ nanotubes at temperatures ranging from 350° C. to 600° C. Annealing at temperatures below 600° C. did not seem to affect the morphology of the nanotubes. However, when annealed at 600° C., the structure was destroyed. The protrusions emanating from the underlying titanium support is believed to be the major cause of the material degradation at this temperature. Annealing took place in air.

Figure 2B:
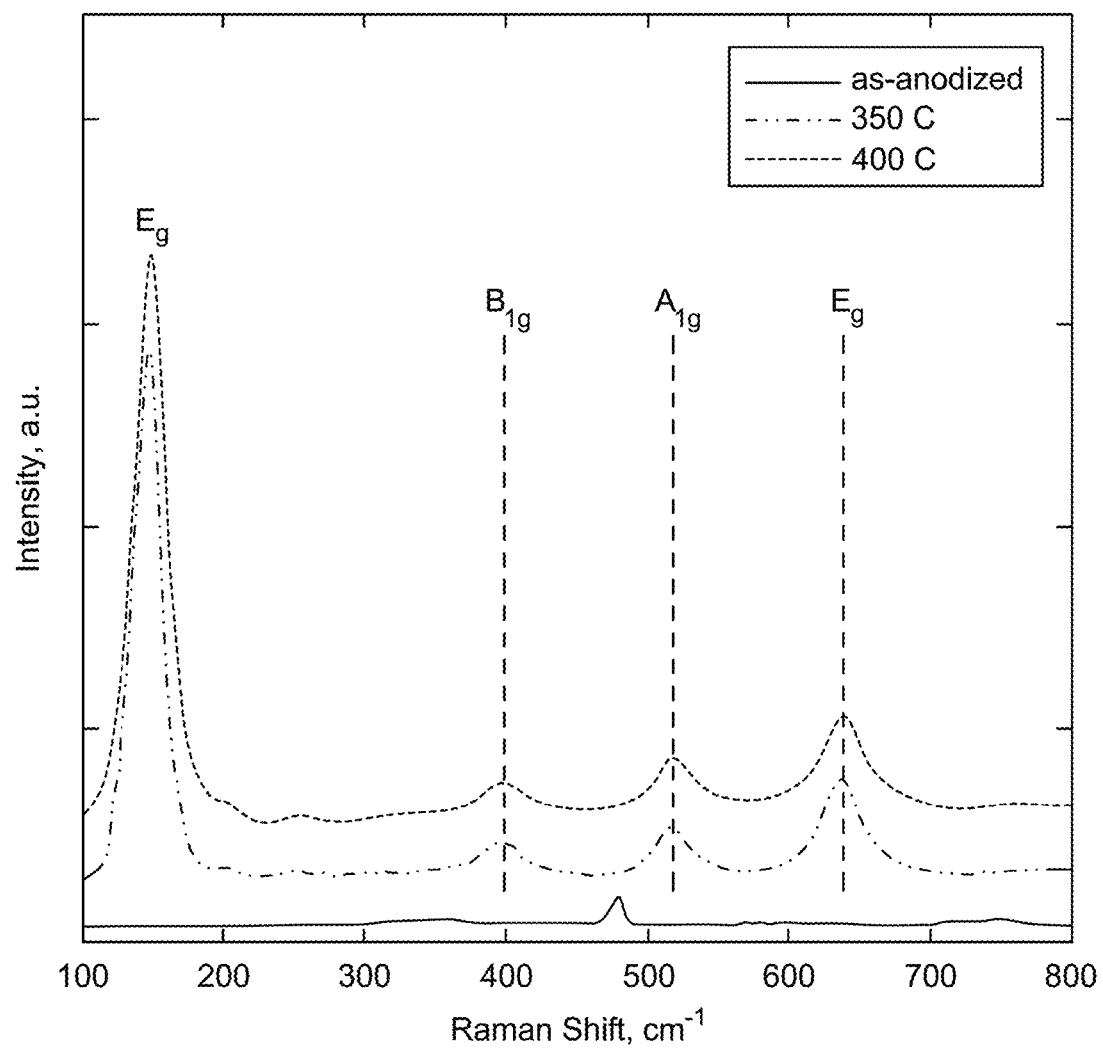
FIG. 2B shows the results of Raman spectroscopy for the annealed sub-100 nm TiO2 tubes.

Raman spectroscopy was further used to characterize the as-anodized and the annealed sub-100 nm $TiO_2$ tubes, see FIG. 2*b*. Based on the space group D4h for anatase and assuming site symmetries for the TI and 0 atoms within the unit cell, six Raman-allowed transitions can be assigned (1A1g, 2B1g and 3Eg). Note that four Raman-active modes were observed for our material as Eg (148 $cm^{-1}$), B1g (397 $cm^{-1}$), A1g (516 $cm^{-1}$) and Eg (636 $cm^{-1}$), confirming the formation of anatase phase upon annealing. The as-anodized sample showed two broad bands at 300-350 $cm^{-1}$ and 600-650 $cm^{-1}$ with one sharp peak at 479 $cm^{-1}$ confirming the partial crystallinity of the as-anodized nanotubes, in accordance with the XRD results. The weak and broad band observed at 780-790 $cm^{-1}$ can be assigned as the first overtone of the B1g mode. According to the bond length/Raman frequency/covalency correlations, the following relationship between Ti—O bond lengths (R) and Raman frequency (v) shifts was reported:

$$v_{Ti-O} = 722\ e^{-1.54946(R-1.809)} \quad (1)$$

The calculated Ti—O bond lengths (2×1.90, 3×2.03 and 2.14 Å) based on the observed Raman bands at 636, 516, and 397 $cm^{-1}$ are consistent with the slightly distorted $TiO_6^{8-}$ octahedron in anatase (Ti—O bond lengths for bulk anatase are 4×1.9338 Å and 2×1.9797 Å). Also, based on the sharp Raman band at 148 $cm^{-1}$, the calculated bond length is 2.95 Å, which is consistent with Ti—Ti bonding present in the octahedral chains.

Figure 2C:
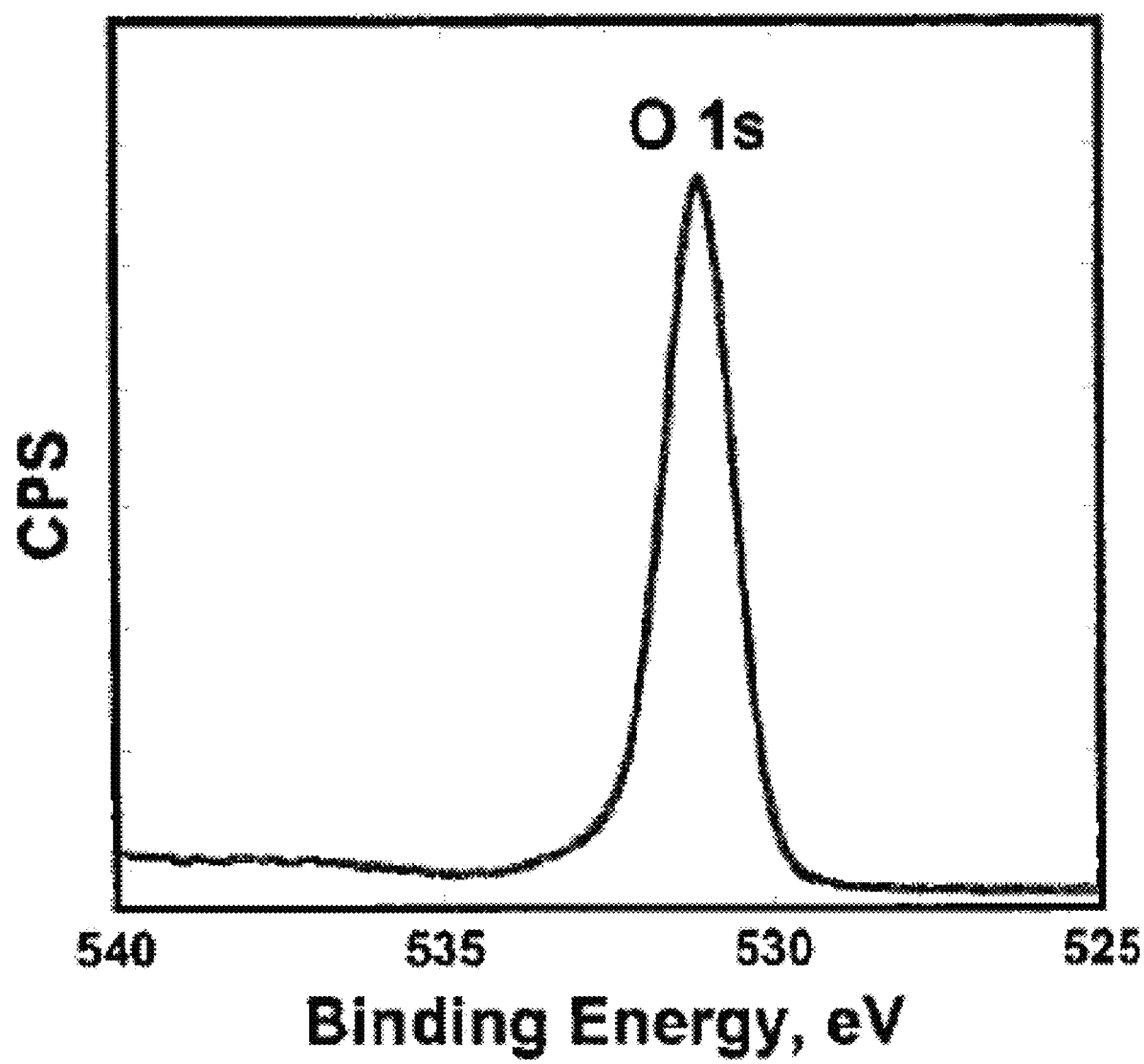
FIG. 2C shows the O1s photoemission spectra for $TiO_2$ nanotubes.
Figure 2D:
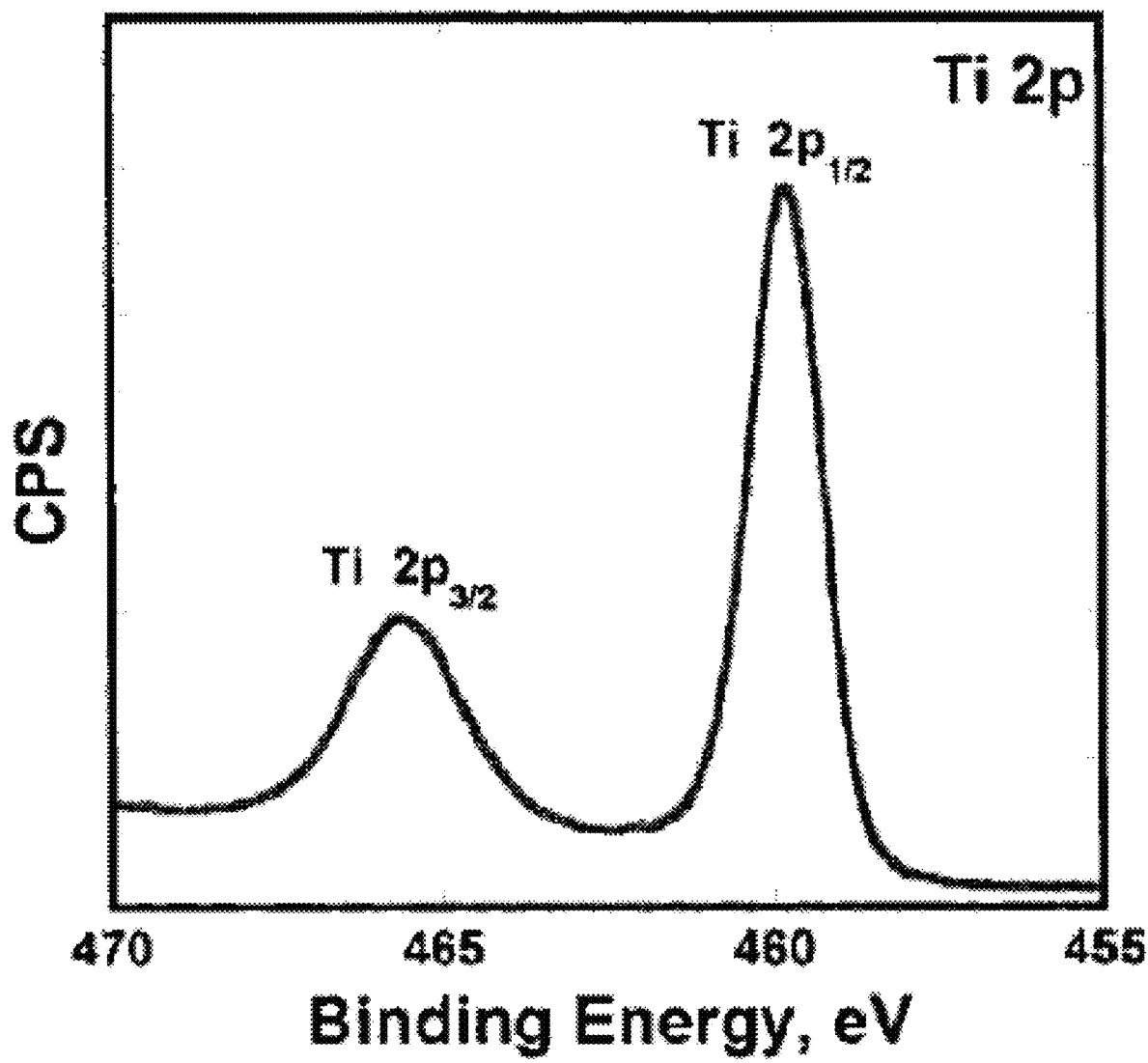
FIG. 2D shows the Ti 2p photoemission spectra with two peaks obtained corresponding to Ti 2 p3/2 and Ti 2 p1/2 photoemissions with a spin-orbit splitting of 5.8 eV.

X-ray photoelectron spectroscopy (XPS) analysis was performed using a Thermo Scientific K-alpha XPS with an Al anode to investigate the composition of the fabricated sub-100 nm $TiO_2$ hollow architectures. Spectra were charge referenced to O is at 532 eV. FIG. 2*c* shows the O1s photoemission spectra, where one signal at 530.87 eV was observed that can be attributed to the lattice oxygen in $TiO_2$. FIG. 2*d* shows the Ti 2p photoemission spectra with two peaks obtained corresponding to Ti 2 p3/2 and Ti 2 p1/2 photoemissions with a spin-orbit splitting of 5.8 eV, confirming that both signals correspond to $Ti^{4+}$, with the Ti/O molar ratio being close to the stoichiometric proportion.

Figure 3A:
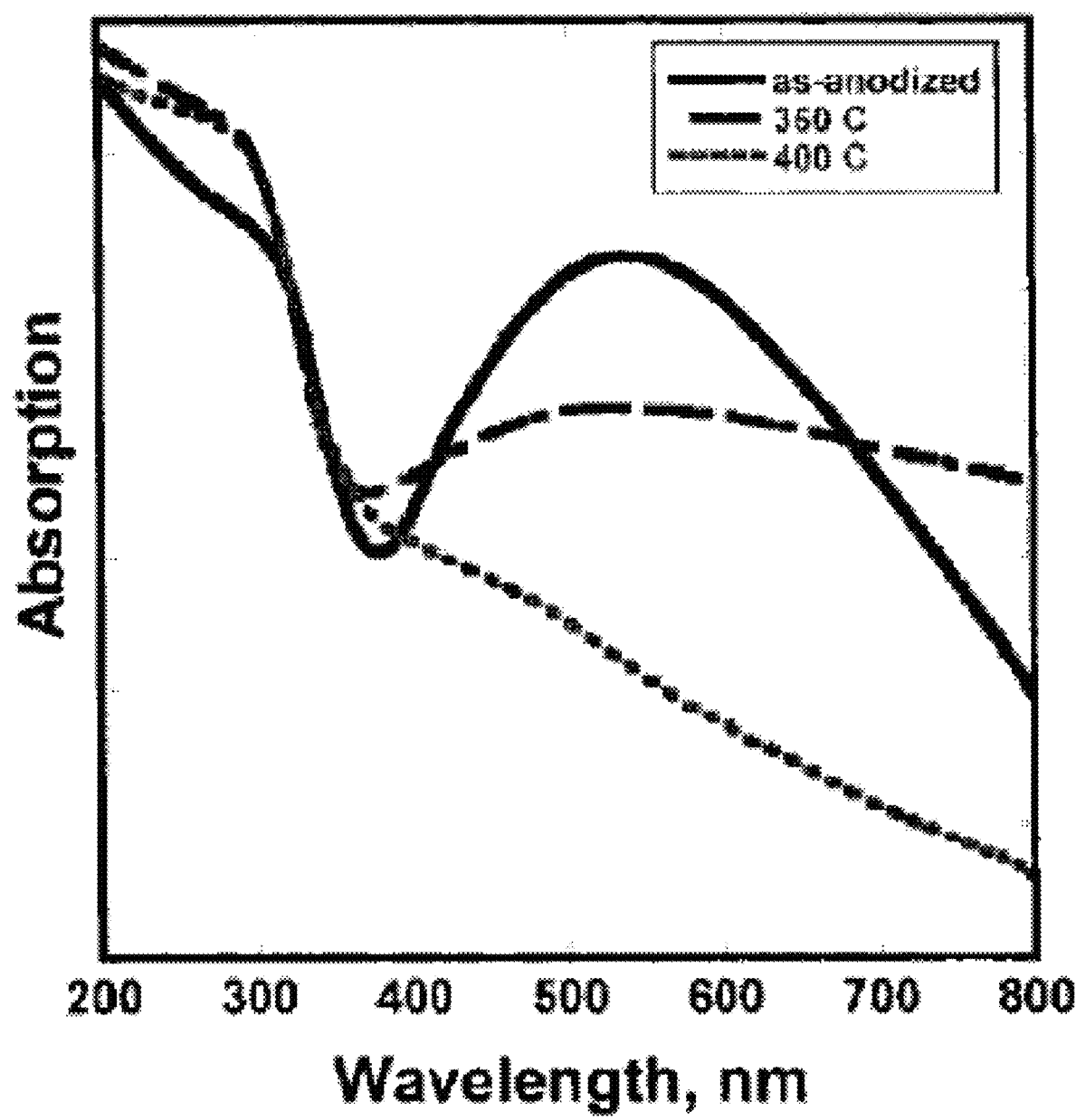
FIG. 3A shows the diffuse reflectance spectra (DRS) of both as-anodized and annealed sub-100 nm $TiO_2$ tubular architectures arrays.

The diffuse reflectance spectra (DRS) of both as-anodized and annealed sub-100 nm $TiO_2$ tubular architectures arrays were measured to investigate the optical properties of the fabricated electrodes (see FIG. 3*a*). The spectra of the as-anodized $TiO_2$ sample shows a fundamental absorption edge in the UV region at 378 nm, typical for anatase $TiO_2$ with a band-gap energy of ca. 3.2 eV. As the annealing temperature increases, a very slight red shift appears in the spectra reaching 411 nm for the sample annealed at 400° C. Note that the as-anodized sample showed another broad absorption peak extending from 400 to 800 nm, which can be attributed to the existence of defects and trapped holes. This broad peak was diminished with increasing the annealing temperature, indicating that annealing improves the crystallinity and helps eliminating the defects.

Example 2: Use of Sub-100 nm Nanotubes from Example 1 in the Photoelectrolysis of Water A photoelectrochemical activity test for water photoelectrolysis using the synthesized sub-100 nm $TiO_2$ tube arrays of Example 1 was carried out in a three-electrode electrochemical cell.

Figure 3B:
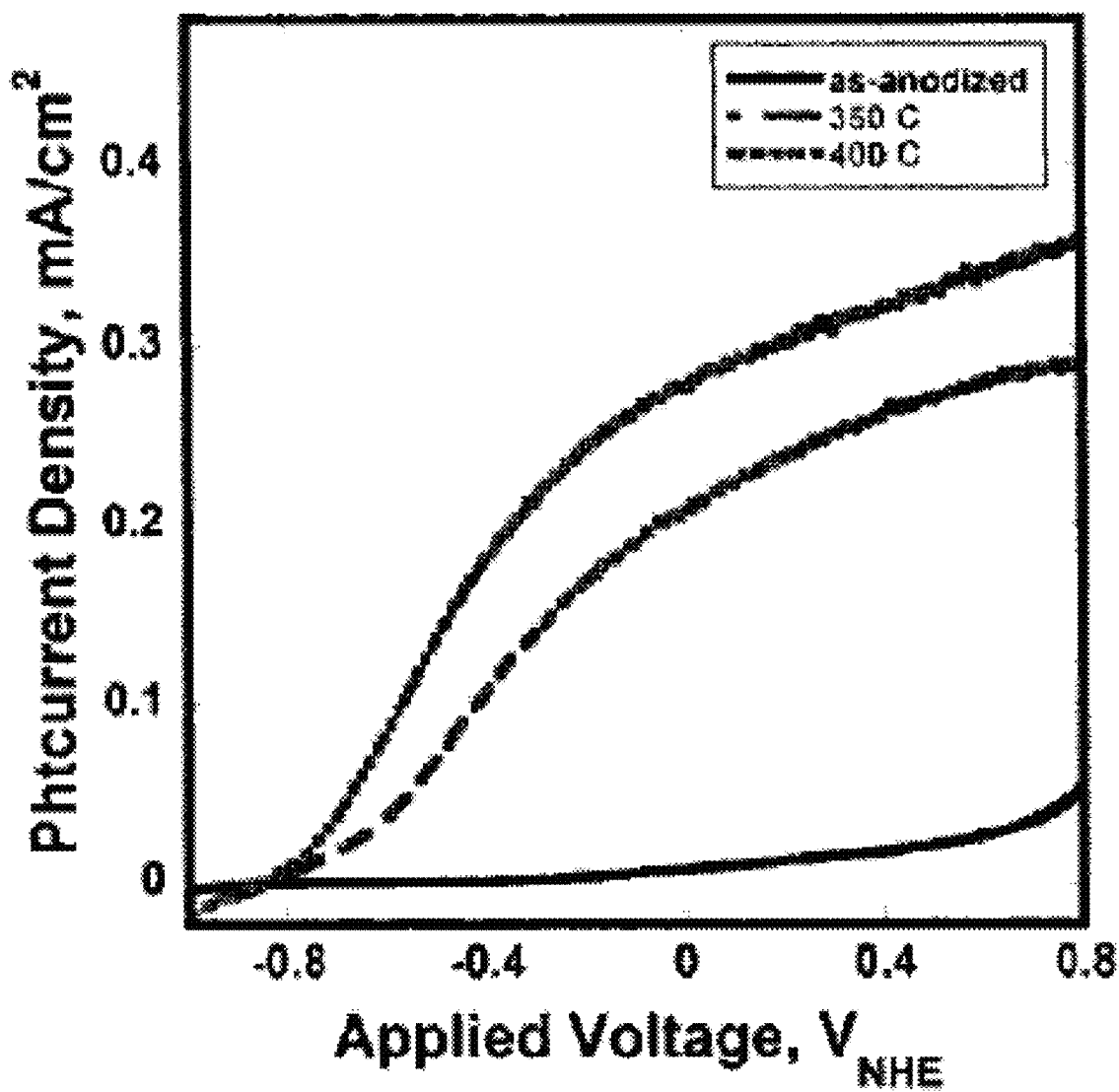
FIG. 3B shows the photocurrent density versus potential in 1 M KOH solution under AM1.5 illumination (100 mW $cm^{-2}$) for the as-anodized as well as annealed $TiO_2$ nanotubes.

FIG. 3*b* shows the photocurrent density versus potential in 1 M KOH solution under AM 1.5 illumination (100 mW $cm^{-2}$) for the as-anodized as well as annealed $TiO_2$ nanotubes. The dark current was less than 50 µA $cm^2$ for all samples over the displayed potential range. The maximum photocurrent exhibited by the $TiO_2$ nanotubes annealed at 400° C. was 0.37 mA $cm^{-2}$ at 0.8 VNHE. Note that this photocurrent is almost 3 times higher than that reported for long nanotubes.

The photocell used in this example is a Teflon photocell, where an area of the cell in which the sample is exposed to light is 0.5 $m^2$. The light was focused on this 0.5 $m^2$ area.

The high photocurrent-to-dark current ratio implies that the majority of the photocurrent is generated only by absorbed photons with no dark-current contribution. Also, the onset potential (−0.87 and −0.85 VNHE for the nanotubes annealed at 350° C. and 400° C., respectively), the light contribution toward the minimum potential needed for water splitting process to take place, is more negative than that reported for long nanotubes (−0.7 to −0.8 VNHE).

Therefore, the sub-100 nm tubes require less voltage for water oxidation than the conventional long nanotube counterparts, indicating more favorable photoelectrochemical activity. Without wishing to be bound to a particular theory, it is believed that this photoelectrochemical activity can, in part, be related to the small crystallite size in the fabricated sub-100 nm tubes (6-9 nm). As the particle size decreases, the ratio of surface-to-bulk defects is believed to increase, resulting in strong positive effects from surface defects that are enough to overcome the negative effects from bulk defects, leading to the observed enhancement in photocurrent. Note that the quantization effect cannot be considered for $TiO_2$ particles with sizes>3 nm.

Figure 3C:
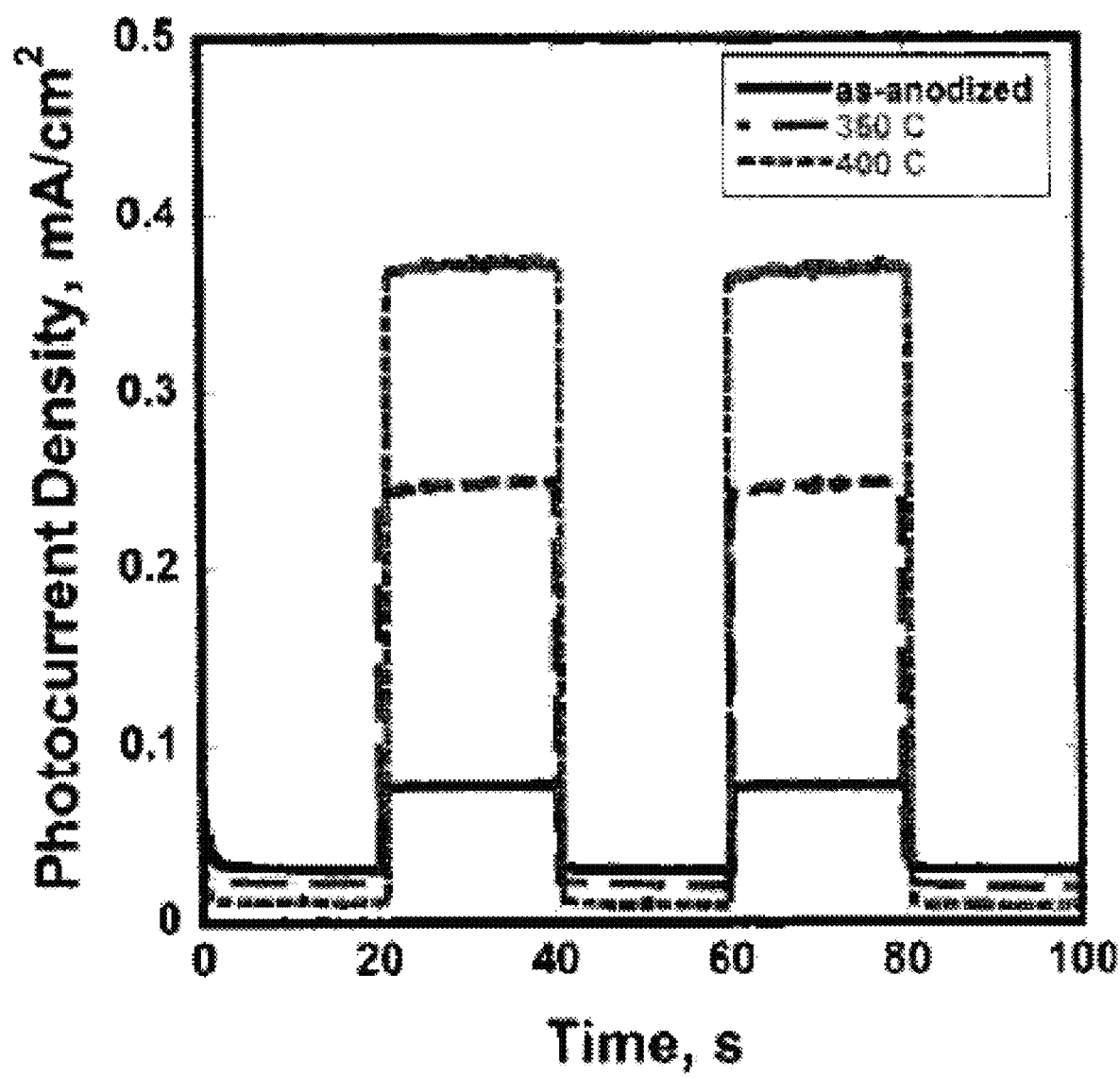
FIG. 3C shows the transient photocurrent {J-t} test for sub-100 nm TiO2 tubular structures.

To assess the stability of the sub-100 nm $TiO_2$ tubular structures, the transient photocurrent (J-t) test was carried out under light on/off conditions at constant external bias of 0.8 VNHE, as shown in FIG. 3*c*. The photocurrent of the tested electrodes decay very sharply under light-off conditions without exhibiting pronounced photocurrent tails suggesting that the fabricated photoanodes have excellent carrier transport properties. To better understand the charge carrier collection efficiency in the sub-100 nm $TiO_2$ tubes, incident photon-to-current collection efficiency (IPCE) experiments were performed under no applied bias. The experiments were performed in a two-electrode cell with the nanotube array as the working photoelectrode and platinum foil as the counter electrode in 1.0 M KOH solution. The IPCE was calculated using Eq. (2), where λ is the wavelength of the incident light, $j_{ph}$ is the photocurrent density under illumination at λ and $1_o$ is the incident light intensity at λ:

$$\text{IPCE \%} = |J_{ph}(\text{mA cm}^{-2})| \times 1239.8(V \times nm) I_o(\text{mW cm}^{-2}) \times \lambda(nm) \times 100 \quad (2)$$

Figure 3D:
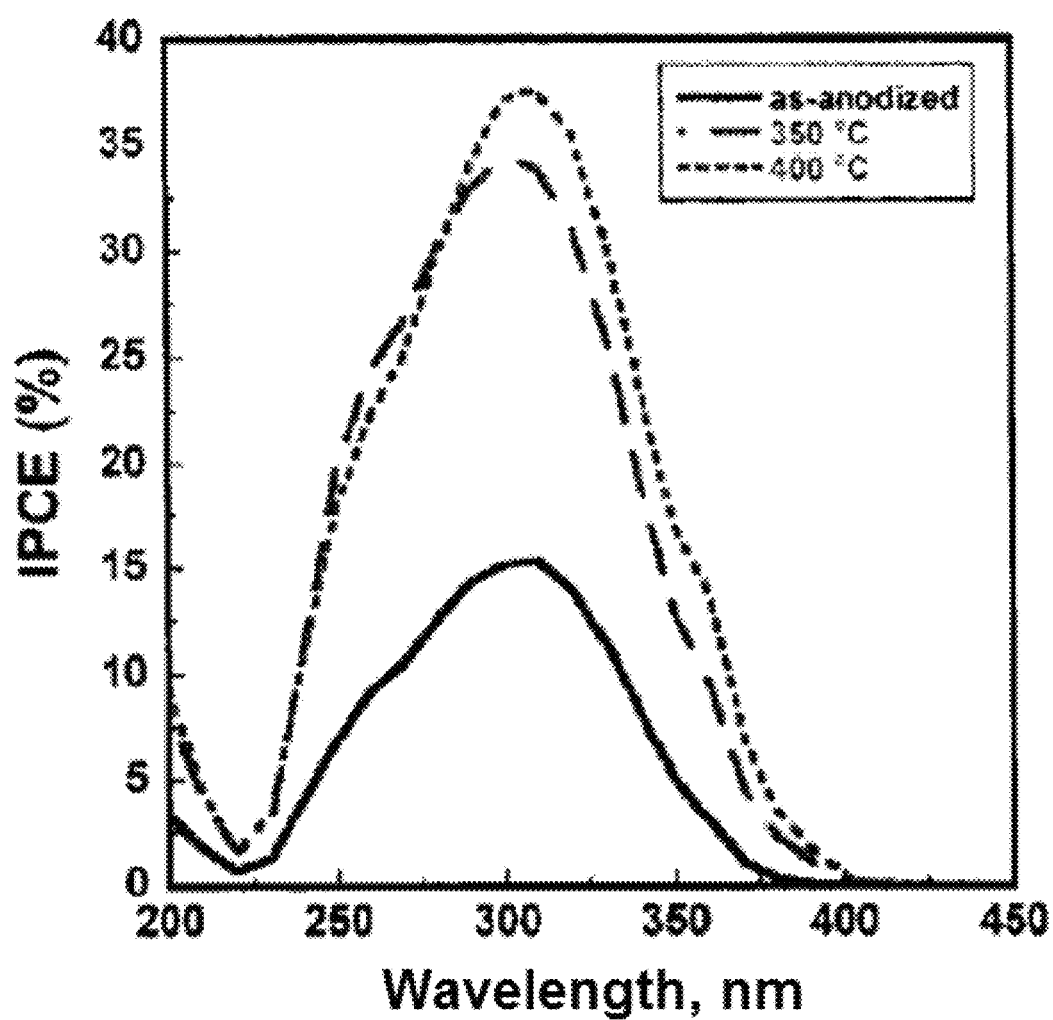
FIG. 3D shows the obtained IPCE curves for the as-anodized as well as the annealed sub-100 nm $TiO_2$ tubes.

FIG. 3*d* shows the obtained IPCE curves for the as-anodized as well as the annealed sub-100 nm $TiO_2$ tubes.

The annealed samples showed higher IPCE values compared to the as-anodized sample, reaching 37 to 40% for the sample annealed at 400° C.

This can be related to the better crystallinity and the reduced defects upon annealing, in agreement with the Raman and XRD results. Note that the obtained IPCE values are among the highest reported for undoped $TiO_2$ under no applied bias.

Comparative Example 1: Zirconium

Example 1 was repeated but the pure titanium foil samples (1 cm×1.5 cm) were replaced with pure zirconium samples. A porous zirconium oxide layer formed, but sub-100 nm nanotubes of $ZrO_2$ were not obtained.

Comparative Example 2: Different Polymer

Example 1 was repeated but the polymer was changed. Polyvinylpyrrolidone (M.W.~40,000 g/mol, Loba Chemie) of Example 1 was replaced with Polyvinylpyrrolidone (M.W.~1,360,000 g/mol, Loba Chemie).

The current surged during anodization, leading to decay of the metal and nanotubes were not formed.

Comparative Example 3: Polymer Absent

Example 1 was repeated but the polymer was absent from the electrolyte solution. Sub-100 nm $TiO_2$ nanotubes were obtained, however, these nanotubes were amorphous rather than partially crystalline.

We claim:

1. An array of transition metal tubular architectures,
   wherein the transition metal tubular architectures comprise nanotubes comprising a transition metal oxide that comprises titanium oxide, titanium sulfide, or titanium selenide,
   wherein transition metal tubular architectures range in length from 50 nm to less than 100 nm, and
   wherein the transition metal tubular architectures exhibit by X-ray diffraction a signature of at least one polycrystalline phase and are characterized by diffraction peaks at 25.3°, 37.7°, 47.8°, 53.8°, and 54.9° (2θ) in XRD pattern analysis, corresponding to the (101), (004), (200), (105), and (211) facets.

2. The array of transition metal tubular architectures of claim 1, which is made by a method comprising oxidizing a transition metal, said transition metal immersed in a fluid medium that comprises an electrolyte, an acid, and a polymer, wherein the electrolyte comprises $NH_4F$ and the acid comprises acetic acid.

3. The array of transitional metal tubular architectures of claim 1 that comprise titanium oxide.

4. The array of transitional metal tubular architectures of claim 1 that comprise titanium sulfide.

5. The array of transitional metal tubular architectures of claim 1 that comprise titanium selenide.

6. The array of transition metal tubular architectures according to claim 1, wherein 100% of the transition metal tubular architectures are less than 100 nm in length.

7. The array of transition metal tubular architectures according to claim 1, wherein the transition metal tubular architectures comprise a transition metal oxide, sulfide, or selenide or mixtures thereof in the form of a hollow nanotube.

8. The array of transition metal tubular architectures according to claim 1, wherein the transition metal tubular architectures further comprise an oxide, sulfide, or selenide of at least one transition metal selected from the group consisting of Y, Zr, V, Ta, and db.

9. The array of transition metal tubular architectures according to claim 1, wherein the transition metal tubular architectures are at least partially crystalline.

10. The array of transition metal tubular architectures according to claim 1, wherein the transition metal tubular architectures further comprise an oxide of at least one transition metal selected from the group consisting of Y, Zr, and V.

11. The array of transition metal tubular architectures according to claim 10, wherein the transition metal tubular architectures are at least partially crystalline.

12. The array of transition metal tubular architectures according to claim 1, wherein the transition metal tubular architectures consist essentially of titanium dioxide.

13. The array of transition metal tubular architectures according to claim 1, wherein at least 80% of the transition metal tubular architectures consist essentially of titanium dioxide nanotubes.

14. The array of transition metal tubular architectures according to claim 1, wherein at least 85% of the transition metal tubular architectures consist essentially of titanium dioxide nanotubes.

15. The array of transition metal tubular architectures according to claim 1, wherein at least 90% of the transition metal tubular architectures consist essentially of titanium dioxide nanotubes.

16. The array of transition metal tubular architectures according to claim 1, wherein at least 95% of the transition metal tubular architectures consist essentially of titanium dioxide nanotubes.

17. The array of transition metal tubular architectures according to claim 1, wherein the transition metal tubular architectures are substantially crystalline.

18. A method of making an array of transition metal tubular architectures according to claim 1, the method comprising oxidizing a transition metal, wherein said transition metal is immersed in a fluid medium that comprises an electrolyte, an acid, and a polymer.

* * * * *